United States Patent
Okamura et al.

(10) Patent No.: US 9,001,922 B2
(45) Date of Patent: Apr. 7, 2015

(54) POWER TRANSMITTER AND WIRELESS POWER TRANSMISSION SYSTEM

(75) Inventors: Shutai Okamura, Cupertino, CA (US); Keisuke Kinoshita, Osaka (JP); Junichi Kawamura, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 692 days.

(21) Appl. No.: 13/227,663

(22) Filed: Sep. 8, 2011

(65) Prior Publication Data
US 2012/0063505 A1   Mar. 15, 2012

(30) Foreign Application Priority Data

Sep. 10, 2010 (JP) .................. 2010-202580
Jul. 25, 2011 (JP) .................. 2011-162226

(51) Int. Cl.
| | | |
|---|---|---|
| H04L 27/00 | (2006.01) | |
| H03K 7/08 | (2006.01) | |
| H04B 5/00 | (2006.01) | |
| H02J 5/00 | (2006.01) | |
| H02J 17/00 | (2006.01) | |

(52) U.S. Cl.
CPC ............ H04B 5/0093 (2013.01); H04B 5/0006 (2013.01); H04B 5/0037 (2013.01); H02J 5/005 (2013.01); H02J 17/00 (2013.01); H04R 2201/028 (2013.01); H04R 2420/07 (2013.01)

(58) Field of Classification Search
CPC .............. Y02B 60/50; Y02B 60/1278; Y02B 60/1282; H04B 1/1615; H04B 5/0037; H04W 52/0274; G06F 1/32; G06F 1/025; H02J 7/0068; H02J 9/005; H02J 17/00; H02J 7/025; H04N 21/4432; H04L 1/0003; H04L 1/0071; H04L 5/0007; H04L 1/0009; H04L 27/0008; H04L 25/4902; H03K 7/08; H03F 3/217; H03F 2200/351

See application file for complete search history.

(56) References Cited

U.S. PATENT DOCUMENTS

| | | | |
|---|---|---|---|
| 7,251,510 B2 * | 7/2007 | Irie | 455/575.1 |
| 2005/0058153 A1 * | 3/2005 | Santhoff et al. | 370/466 |
| 2005/0075146 A1 | 4/2005 | Kridner | |
| 2005/0233695 A1 * | 10/2005 | Cho | 455/13.4 |

(Continued)

FOREIGN PATENT DOCUMENTS

| | | |
|---|---|---|
| JP | 63-246943 A | 10/1988 |
| JP | 10-014139 A | 1/1998 |

(Continued)

OTHER PUBLICATIONS

Notice of Reasons for Rejection for corresponding Japanese Application No. 2011-162226 mailed on Aug. 5, 2014 (with English translation).

*Primary Examiner* — Tesfaldet Bocure
(74) *Attorney, Agent, or Firm* — Renner, Otto, Boisselle & Sklar, LLP

(57) ABSTRACT

A power transmitter 50 is usable in a wireless power transmission system for transmitting power wirelessly. The power transmitter 50 includes a power transmitting section 51 for transmitting power; a communication section 52 for communicating information, for controlling the transmission of the power, with the power receiver 60; and a control section 53 for controlling the power transmitting section 51 such that the power to be sent out by the power transmitting section 51 is higher while the communication section 52 is performing the communication.

13 Claims, 16 Drawing Sheets

(56) References Cited

U.S. PATENT DOCUMENTS

| | | |
|---|---|---|
| 2005/0245292 A1* | 11/2005 | Bennett et al. ............... 455/574 |
| 2007/0133818 A1* | 6/2007 | Griffin ........................ 381/94.1 |
| 2007/0199029 A1* | 8/2007 | Kim .............................. 725/81 |
| 2008/0132294 A1* | 6/2008 | Bennett et al. ............ 455/569.1 |
| 2008/0197802 A1 | 8/2008 | Onishi et al. |
| 2009/0140691 A1* | 6/2009 | Jung ............................ 320/108 |
| 2010/0057160 A1* | 3/2010 | De Ridder ...................... 607/45 |
| 2010/0141042 A1 | 6/2010 | Kesler et al. |
| 2010/0181961 A1 | 7/2010 | Novak et al. |
| 2010/0201310 A1 | 8/2010 | Vorenkamp et al. |
| 2011/0221580 A1* | 9/2011 | Marsanne et al. ......... 340/13.24 |
| 2011/0222709 A1* | 9/2011 | Griffin ........................ 381/94.1 |
| 2012/0276942 A1* | 11/2012 | Mason et al. ................. 455/522 |
| 2012/0303939 A1* | 11/2012 | Cain et al. ........................ 713/1 |

FOREIGN PATENT DOCUMENTS

| | | |
|---|---|---|
| JP | 2005-117664 A | 4/2005 |
| JP | 2008-206233 A | 9/2008 |
| JP | 2009-153056 A | 9/2008 |
| WO | WO 2009/116025 A2 | 9/2009 |

* cited by examiner

FIG.5A PULSE GENERATED BY FIRST PULSE WIDTH MODULATION PROCESSING

FIG.5B PULSE GENERATED BY SECOND PULSE WIDTH MODULATION PROCESSING

POWER TRANSMITTER AND WIRELESS POWER TRANSMISSION SYSTEM

BACKGROUND OF THE INVENTION

1. Field of the Invention

The present invention relates to a power transmitter and a wireless power transmission system for transmitting power wirelessly.

2. Description of the Related Art

In a conventional audio device, an audio signal source for generating an audio signal and a speaker for converting the audio signal, which is an electric signal, into vibration of air and reproducing the vibration of air as a sonic wave are connected to each other via a cable, and the audio signal is transmitted to the speaker via the cable. However, it is occasionally desirable not to use the cable which connects the audio signal source and the speaker for various reasons such as the installation environment, convenience, appearance and the like of the audio device. In order to respond to such a demand, there are wireless speaker devices for transmitting an audio signal generated by the audio signal source to the speaker wirelessly using wireless communication.

FIG. 17 shows a general structure of a wireless speaker device. A wireless speaker device 1 includes a transmitter 10 and a receiver 20. The transmitter 10 includes a power supply section 14 for receiving power from an electric outlet or a battery, an audio signal source 11, a wireless modulation section 12, and a transmission antenna 13. The wireless modulation section 12 included in the transmitter 10 generates a carrier wave of a frequency used for wireless communication, and modulates the carrier wave with an audio signal generated by the audio signal source 11. The transmitter 10 transmits the carrier wave modulated with the audio signal to the receiver 20 via the transmission antenna 13.

The receiver 20 includes a power supply section 25, a wireless demodulation section 22, an audio signal amplifier section 23, and a speaker 24. The receiver 20 first detects and demodulates the wireless signal, received by a receiving antenna 21, by means of the wireless demodulation section 22 to extract the audio signal. Then, the receiver 20 amplifies the extracted audio signal until the audio signal acquires a voltage sufficient to drive the speaker 24 by means of the audio signal amplifier section 23, and then inputs the audio signal to the speaker 24.

Use of such a wireless speaker device can dispense with a cable for connecting the audio signal source and the speaker to each other. As a result, the audio device has a higher degree of freedom of installation and also has a better appearance.

However, as shown in FIG. 17, the receiver 20 in the wireless speaker device 1 needs to include the power supply section 25 for supplying power to the wireless demodulation section 22 for detecting and demodulating the received signal and to the audio signal amplifier section 23 for amplifying the demodulated audio signal. Therefore, the receiver 20 needs to be connected to an AC power supply or to have a built-in battery. In order to connect the receiver 20 to an AC power supply, a power supply cable is needed for connecting the outlet on the wall to the receiver. This lowers the freedom of installation of the audio device and also deteriorates the appearance of the audio device. In the case where a battery is built in, there is a problem that each time the battery is consumed, the battery needs to be exchanged or charged.

As a technology for solving these problems, for example, Japanese Laid-Open Patent Publications Nos. 2005-117664 and 2009-153056 disclose a device for transmitting power and an audio signal wirelessly.

Japanese Laid-Open Patent Publication No. 2005-117664 discloses a transmitter which rectifies a part of the audio signal to be transmitted and supplies the part of the audio signal to a wireless modulation section in the transmitter as power. A carrier wave generated by the wireless modulation section is modulated with the remaining part of the audio signal. A receiver supplies, as power, a part of a signal voltage obtained by detection and demodulation to a wireless demodulation section for detecting and demodulating the received wireless signal, and thus drives the wireless demodulation section. Owing to such a structure, the audio signal output from the transmitter can be transmitted to the receiver without use of the cable.

Japanese Laid-Open Patent Publication No. 2009-153056 discloses a wireless speaker device which transmits a carrier wave amplitude-modulated with an audio signal from a transmission antenna included in a transmitter by a resonant magnetic coupling method described below. A receiver obtains an AC voltage and a DC voltage for driving an electrostatic speaker based on an AC voltage generated in a receiving antenna. Owing to such a structure, a wireless speaker device requiring no power supply such as a battery or the like can be provided.

Attempts to transmit power wirelessly have been made for various electric devices as well as for wireless speakers as described above. For example, electric shavers and electric toothbrushes adopting a wireless power transmission method using the electromagnetic induction principle (hereinafter, referred to as the "electromagnetic induction method") have been developed as commercial products. Such wireless power transmission by the electromagnetic induction method is disclosed in, for example, Japanese Laid-Open Patent Publication No. 2008-206233.

Meanwhile, as a method capable of transmitting power for a longer distance than the electromagnetic induction method and thus capable of further raising the freedom of the installation positions of the power transmitter and the power receiver, a wireless power transmission method using a resonance phenomenon of an electromagnetic field is known. This method called the resonant magnetic coupling method is currently under research and development, and is expected to further expand the applicable range of the wireless power transmission. The wireless power transmission using the resonant magnetic coupling method is disclosed in detail in, for example, United States Laid-Open Patent Publication No. 2010/0141042.

According to the resonant magnetic coupling method, the power transmitter and the power receiver both include a resonator. The resonator in the power transmitter (power transmission-side resonator) and the resonator in the power receiver (power receiving-side resonator) are set to have a matching resonant frequency. Owing to this, power is transmitted from the power transmission-side resonator to the power receiving-side resonator using the resonance phenomenon.

In general, the efficiency of the wireless power transmission is in proportion to kQ, which is the product of a coupling coefficient k between the power transmission-side resonator and the power receiving-side resonator and the quality factor of the resonators. Generally in the resonant magnetic coupling method, resonators having a quality factor on the order of several thousand are used. Owing to this, even when the coupling coefficient k is small, for example, even when the distance between the power transmitter and the power receiver is long or even when the axes of coils of the power transmission-side resonator and the power receiving-side resonator are shifted from each other, a relatively high power transmission efficiency can be maintained.

For transmitting power wirelessly, the power transmitter and the power receiver need to communicate to each other via a wireless communication section in order to, for example, confirm that the power receiver is present, perform authentication between the power transmitter and the power receiver, control the power transmission to be started and terminated, and notify a change in the power transmission efficiency caused by a change in the load or a change in the distance between the power transmitter and the power receiver. Such communication made to control the power transmission is disclosed in, for example, Japanese Laid-Open Patent Publication No. 2008-206233 and United States Laid-Open Patent Publications Nos. 2010/0181961 and 2010/0201310.

As one example, communication made to control the power transmission in a wireless power transmission system for transmitting an audio signal in superposition on the power will be discussed. In this case, the power transmitter transmits a request signal, requesting that the state of the power receiver be checked, from the wireless communication section during the power transmission. The power receiver transmits a response to the request signal from the wireless communication section included in the power receiver. In this step, the power receiver needs to drive the wireless communication section in order to receive the signal transmitted from the power transmitter and transmit the response signal. For this purpose, a part of the audio signal transmitted from the power transmitter is converted into DC power and supplied to the wireless communication section as power. As a result, the power supplied to the speaker is decreased as compared with the case where the wireless communication section is not driven. Namely, there is a problem that the volume of the audio signal reproduced from the speaker is changed depending on whether a request signal is received or not.

This problem occurs in wireless power transmission systems for transmitting an audio signal to a speaker and also in other wireless power transmission systems. For example, even in a system in which power and program information are transmitted wirelessly to a liquid crystal display section mounted on a remote control or the like of a TV receiver from a main body, the power transmitter and the power receiver may communicate to each other. In such a system, while communication is being performed, the power which is transmitted is decreased and there may occur a problem that, for example, the luminance of the liquid crystal display section is lowered. Even in a system for transmitting only power but not transmitting information such as voice, video or the like, there may occur a problem that when the power transmitter and the power receiver communicate to each other to control the transmission, stable power transmission cannot be maintained.

SUMMARY OF THE INVENTION

The present invention made in light of the above-described problems has an object of maintaining stable wireless power transmission even while a power transmitter and a power receiver are communicating to each other.

A power transmitter according to the present invention is usable in a wireless power transmission system for transmitting power from the power transmitter to a power receiver wirelessly. The power transmitter includes a power transmitting section for transmitting power; a communication section for communicating information, for controlling the transmission of the power, with the power receiver; and a control section for controlling the power transmitting section such that the power to be sent out is higher while the communication section is performing the communication than while the communication section is not performing the communication.

In an embodiment, the power transmitting section transmits the power to be transmitted after converting the power into a pulse train; and the control section controls the power transmitting section such that at least one of a pulse width and a pulse amplitude of the pulse train is larger while the communication section is performing the communication than while the communication section is not performing the communication.

In an embodiment, the control section controls the power transmitting section such that the pulse amplitude of the pulse train is larger while the communication section is performing the communication than while the communication section is not performing the communication.

In an embodiment, the control section controls the power transmitting section such that the pulse width of the pulse train is wider while the communication section is performing the communication than while the communication section is not performing the communication.

In an embodiment, the communication section starts communicating with the power receiver by transmitting a request signal to the power receiver; and when the communication section transmits the request signal, the control section transmits a signal instructing to increase the pulse width of the pulse train to the power transmitting section.

In an embodiment, the power transmitting section generates the pulse train by pulse width modulation.

In an embodiment, the power transmitting section generates the pulse-width-modulated pulse train by comparing a waveform of the power to be transmitted against a triangular wave; and the control section controls the power transmitting section so as to change an amplitude or a cycle of the triangular wave in accordance with whether the communication section is performing the communication or not.

In an embodiment, the control section instructs the power transmitting section to make the amplitude of the triangular wave relatively small while the communication section is performing the communication and to make the amplitude of the triangular wave relatively large while the communication section is not performing the communication.

In an embodiment, the control section instructs the power transmitting section to make the cycle of the triangular wave relatively long while the communication section is performing the communication and to make the cycle of the triangular wave relatively short while the communication section is not performing the communication.

In an embodiment, the power transmitter further includes a signal source for outputting a signal; and the power transmitting section generates the pulse train by performing pulse width modulation on the signal output from the signal source.

In an embodiment, the signal is an audio signal.

In an embodiment, the power transmitting section includes a pulse width modulation section for outputting the pulse train by pulse width modulation; an oscillation section for generating radio frequency power based on the pulse train output from the pulse width modulation section; and a power transmission resonator for transmitting the radio frequency power generated by the oscillation section. The control section controls the power transmitting section by sending a control signal to the pulse width modulation section.

A wireless power transmission system according to the present invention includes a power transmitter and a power receiver. The power transmitter includes a power transmitting section for transmitting power; a power transmitting-side communication section for communicating information, for controlling the transmission of the power, with the power receiver; and a control section for controlling the power transmitting section such that the power to be sent out is higher while the power transmitting-side communication section is performing the communication than while the power transmitting-side communication section is not performing the communication. The power receiver includes a power receiving section for receiving the power sent out from the power transmitting section; and a power receiving-side communication section for communicating with the power transmitting-side communication section.

In an embodiment, the power transmitting section transmits the power to be transmitted after converting the power into a pulse train; and the control section controls the power transmitting section such that at least one of a pulse width and a pulse amplitude of the pulse train is larger while the communication section is performing the communication than while the communication section is not performing the communication.

In an embodiment, the power transmitter further includes a signal source for outputting a signal; the power transmitting section generates the pulse train by performing pulse width modulation on the signal output from the signal source; and the power receiver reproduces the signal from the power received by the power receiving section.

According to the present invention, stable wireless power transmission can be maintained even while communication is being performed during power transmission.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIGS. 8A, 8B and 8C illustrate the processing performed by the pulse width modulation section 102a.

DETAILED DESCRIPTION OF PREFERRED EMBODIMENTS

Before describing preferable embodiments of the present invention, a basic structure in the embodiments according to the present invention will be described.

Figure 1:
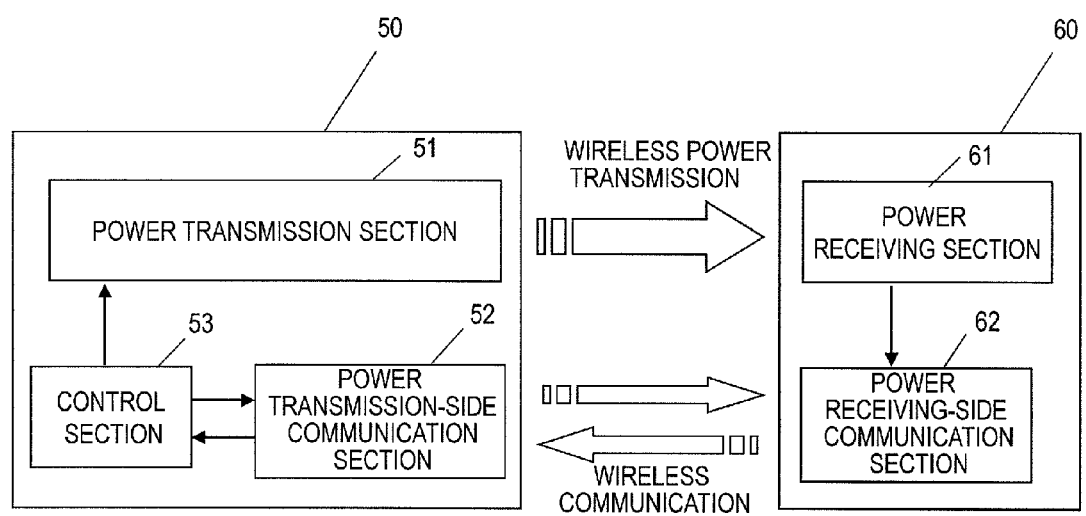
FIG. 1 shows a basic structure of a wireless power transmission system according to embodiments of the present invention.

FIG. 1 is a block diagram showing a basic structure of a wireless power transmission system in the embodiments according to the present invention. The wireless power transmission system includes a power transmitter 50 and a power receiver 60, and can transmit power wirelessly. The wireless power transmission system wirelessly communicates information for controlling the power transmission during the power transmission. Owing to this, the wireless power transmission system can, for example, confirm that the power receiver 60 is present, perform authentication between the power transmitter and the power receiver, control the power transmission to be started and terminated, and notify a change in the power transmission efficiency caused by a change in the load or a change in the distance between the power transmitter and the power receiver.

The power transmitter 50 includes a power transmitting section 51 for transmitting power to space, a power transmitting-side communication section 52 for performing communication with the power receiver 60, and a control section 53 for controlling an operation of the power transmitting section 51. The power receiver 60 includes a power receiving section 61 for receiving at least a part of the power sent out by the power transmitting section 51 and a power receiving-side communication section 62 for performing communication with the power transmitting-side communication section 52.

The power transmitting section 51 in the power transmitter 50 converts the power to be transmitted into, for example, a pulse train, and transmits the power based on the pulse train to the power receiver 60. Owing to this, the power, and also a signal in superposition on the power, can be transmitted. When, for example, an audio signal is to be transmitted in superposition on the power, the power transmitting section 51 performs pulse width modulation on the audio signal output from an external audio signal source and outputs the modulated pulse train.

The control section 53 controls the power transmitting section 51 such that the power sent out by the power transmitting section 51 is higher while the power transmitting-side communication section 52 is performing communication than not. Owing to this, the power transmitted to the power receiver 60 while the communication is being performed can be made higher than that while the communication is not being performed. Such control is made in order to compensate for the decrease of power caused due to power consumption by a load included in the power receiver 60.

While the power transmitter 50 and the power receiver 60 are performing communication with each other, a part of the power received by the power receiving section 61 is supplied to the power receiving-side communication section 62 in order to drive the power receiving-side communication section 62. As a result, the power supplied from the power receiving section 61 to the load is decreased. Therefore, in the case where the above-described control is not performed, the level of power supplied to the load in the power receiver changed each time the communication is performed, and this prevents a stable operation.

For this reason, in the embodiments according to the present invention, the control section 53 is provided to control the power transmitting section 51 such that the power sent out by the power transmitting section 51 during the communication is higher. Owing to such control, the power transmitted to the power receiving section 61 is increased, and so the decrease of power caused due to power consumption by the load can be compensated for.

The power to be sent out by the power transmitting section 51 can be increased by, for example, converting the power to be transmitted into a pulse train and increasing at least one of the pulse width or the pulse amplitude of the pulse train. In this case, the power is in proportion to the area size of the waveform of the pulse train, and so the power to be transmitted can be increased by increasing the pulse width and/or the pulse amplitude.

Hereinafter, the embodiments according to the present invention will be described more specifically with reference to the attached drawings.

Embodiment 1

First, Embodiment 1 According to the Present invention will be described.

Figure 2:
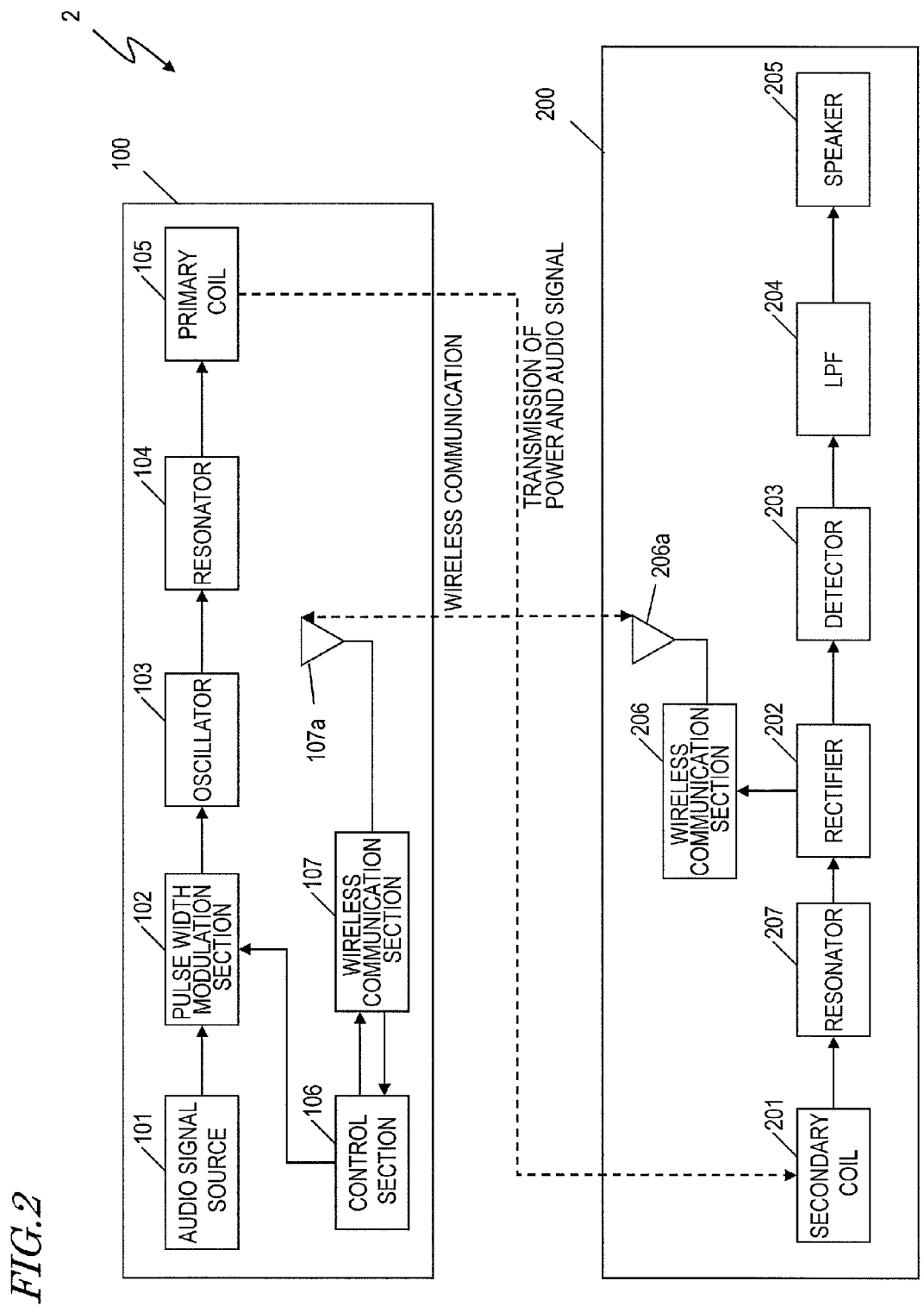
FIG. 2 is a structural view of a wireless power transmission system 2 in Embodiment 1.

FIG. 2 is a block diagram showing a structure of a wireless power transmission system 2 in this embodiment. The wireless power transmission system 2 includes a power transmitter 100 and a power receiver 200.

The power transmitter 100 includes an audio signal source 101, a pulse width modulation section 102, an oscillator 103, a resonator 104, a primary coil 105, a control section 106, and a wireless communication section 107. The power receiver 200 includes a secondary coil 201, a resonator 207, a rectifier 202, a detector 203, a low pass filter (LPF) 204, a speaker 205, and a wireless communication section 206. Although not shown in FIG. 2, the power transmitter 100 is supplied with power from an AC power supply, from a DC power supply such as a battery or the like, or by wireless power transmission from another wireless power transmission system not shown. In this embodiment, the pulse width modulation section 102, the oscillator 103, the resonator 104 and the primary coil 105 correspond to the power transmitting section 51 in FIG. 1.

The wireless power transmission system 2 shown in FIG. 2 transmits an audio signal in superposition on the power by pulse width modulation (PWM). Pulse width modulation is a modulation method of modulating a value of an audio signal into a pulse width and transmitting the pulse width, and has a feature of capable of transmitting an audio signal with two amplitude levels. Therefore, this method can use a saturation region of an amplifier at the time of signal amplification, and so can reduce the circuit scale and power consumption. By use of pulse width modulation for the audio signal format in wireless power transmission in which the audio signal is transmitted in superposition, high quality audio signal transmission with little distortion can be realized.

The wireless power transmission system 2 uses a resonant magnetic coupling type power transmission method as a method for transmitting power and an audio signal to the power receiver 200. The resonant magnetic coupling type power transmission method, by use of resonators having high quality factors, can provide highly efficient transmission even when the coupling coefficient k is small.

The wireless power transmission system 2 transmits the pulse-width-modulated audio signal and the power by means of coupling of resonant magnetic fields occurring between the primary coil 105 and the secondary coil 201. The wireless power transmission system 2 also performs communication via the wireless communication sections 107 and 206 in order to confirm that the power receiver 200 is present, perform authentication between the power transmitter and the power receiver, control the power transmission to be started and terminated, and notify a change in the power transmission efficiency caused by a change in the load or a change in the distance between the power transmitter and the power receiver.

Hereinafter, each element of the power transmitter 100 and the power receiver 200 will be described. First, each element of the power transmitter 100 will be described.

The audio signal source 101 is a circuit for generating an analog or digital audio signal and transmitting the audio signal to the pulse width modulation section 102. The audio signal source 101 generates an audio signal based on a signal obtained from, for example, a recording medium or a transmission medium such as a radio wave or the like (not shown).

The pulse width modulation section 102 is a circuit for performing pulse width modulation on an input signal and outputting the modulated pulse train. More specifically, the pulse width modulation section 102 compares an input signal against a triangular wave having a predetermined cycle and a predetermined amplitude to convert the input signal into a pulse train having a width in accordance with the value of the input signal.

The oscillator 103 is a radio frequency oscillation circuit and includes a circuit for modulating an input signal into a radio frequency signal (e.g., several megahertz to several tens of megahertz) and an amplifier circuit. The amplifier circuit is, for example, a class E amplifier circuit, and switches a transistor with a PWM pulse modulated to be of a radio frequency and thus amplifies the pulse train modulated to be of a radio frequency until the pulse train acquires power necessary for power transmission. The type of the amplifier circuit to be used is not limited to class E and may be any type which uses the transistor switching principle. For example, a circuit generally called a switching amplifier or a saturating amplifier, for example, a class D amplifier circuit or a class F amplifier circuit, may be used.

The resonator 104 is an LC resonant circuit having a resonant frequency same as the output frequency of the oscillator 103. The resonator 104 includes a coil and a capacitor. Preferably, the coil may be formed of a conductor such as copper, silver or the like which has a high conductivity. The capacitor may be any type of element which is, for example, chip-shaped or lead-shaped. The resonator 104 uses the primary coil 105 to form a resonant magnetic field, having a frequency same as the resonant frequency, in space.

The wireless communication section 107 is a circuit for performing wireless communication with the power receiver 200 using an antenna 107a. The wireless communication section 107 includes a transmission circuit for transmitting a signal to the power receiver 200 and a receiving circuit for receiving a signal sent from the wireless communication section 206 in the power receiver 200. The wireless communication section 107 sends a request signal to the wireless communication section 206 in the power receiver 200 on an instruction from the control section 106, and receives a response signal from the wireless communication section 206. This communication is performed, for example, at the start or termination of transmission of the power and an audio signal, when the speaker 205 has been moved, or the load of the power receiver 200 has been changed.

The control section 106 is a circuit for controlling the pulse width modulation section 102 and the wireless communication section 107. When wireless communication is needed, the control section 106 sends a control signal to the wireless communication section 107, thus to control the wireless communication section 107 to send a request signal. In parallel to this, the control section 106 also sends a control signal to the pulse width modulation section 102, thus to control the pulse width modulation section 102 to change the pulse width of the pulse train to be transmitted. The detailed operation of the control section 106 will be described later.

Now, each element of the power receiver 200 will be described.

The resonator 207 is a resonant circuit having a resonant frequency same as that of the power transmission-side resonator 104. The resonator 207 uses the secondary coil 201 to receive energy from the resonant magnetic field formed by the primary coil 105. Owing to this, the power is transmitted wirelessly.

The rectifier 202 is a circuit for converting the power received by the resonator 207 into DC power and supplying the DC power to the detector 203 and the wireless communication section 206. Owing to this, the wireless communication section 206 is driven and thus the power is sent to the detector 203 while being superposed by an audio signal.

The detector 203 is a circuit for detecting rectified power and demodulating the power into a pulse train. The LPF 204 is a low pass filter for removing a radio frequency band component of an input signal. As a result of the radio frequency band component being removed from the received pulse train, an audio signal is generated. The generated audio signal is reproduced from the speaker 205.

The wireless communication section 206 is a circuit for performing wireless communication with the power transmitter 100 using an antenna 206a. The wireless communication section 206 includes a transmission circuit for transmitting a signal to the power transmitter 100 and a receiving circuit for receiving a signal sent from the wireless communication section 107 in the power transmitter 100. The wireless communication section 206 receives a request signal from the wireless communication section 107 in the power transmitter 100 and sends a response signal to the wireless communication section 107.

Hereinafter, an operation of the wireless power transmission system 2 in this embodiment will be described.

First, an operation of the wireless power transmission system 2 while wireless communication is not being performed between the power transmitter 100 and the power receiver 200 will be described.

The audio signal source 101 in the power transmitter 100 outputs an audio signal, to be reproduced by the speaker 205 in the power receiver 200, to the pulse width modulation section 102. The pulse width modulation section 102 performs pulse width modulation on the audio signal input by the audio signal source 101.

Figure 3:
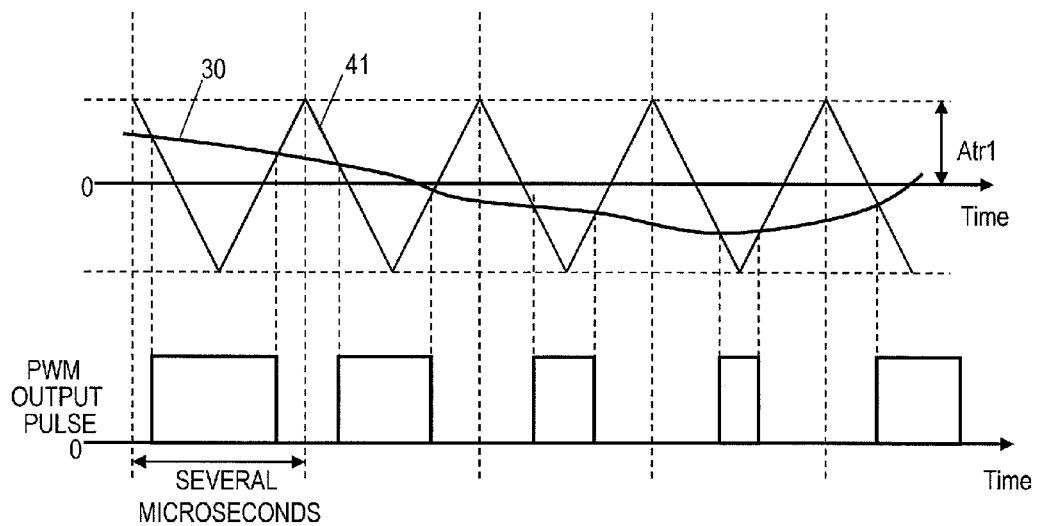
FIG. 3 shows an example of first pulse width modulation processing performed by a pulse width modulation section 102.

FIG. 3 shows an example of pulse width modulation performed in the case where the audio signal sent from the audio signal source 101 is an analog signal. According to the pulse width modulation, an input audio signal 30 is compared against a triangular wave 41 having a cycle of several microseconds (frequency: several hundred kilohertz to several megahertz) and a maximum amplitude Atr1. Only in the time period in which the value of the audio signal 30 is larger than the value of the triangular wave 41 as a result of the comparison, a pulse having a positive value is output. The comparison is performed such that a pulse having a duty ratio of 50% in the case where no audio signal is input or where the value of the audio signal is 0 is output.

The audio signal source 101 may be structured to output digital audio data (pulse-code-modulated signal) represented by a sampling frequency fs and a quantized bit rate bq to the pulse width modulation section 102. In this case, the pulse width modulation section 102 performs signal processing such as oversampling, noise shaping (Δ modulation) or the like on a PCM signal, then compares the resultant PCM signal against the triangular wave, and outputs a pulse train having a certain amplitude. Alternatively, a structure of determining the pulse width in accordance with the level of the digital audio signal without using a triangular wave may be adopted. Such a structure will be described in detail later.

In the following description, the above-described pulse width modulation processing will be referred to as the "first pulse width modulation processing", and the triangular wave used in the first pulse width modulation processing will be referred to as the "first triangular wave". The pulse width modulation section 102 sends the pulse train obtained by performing the first pulse width modulation processing on the audio signal to the oscillator 103.

The oscillator 103 performs amplitude modulation on the pulse train at an output frequency of several megahertz to several tens of megahertz and thus amplifies the pulse train until the pulse train acquires power necessary for power transmission. The oscillator 103 sends the amplified pulse train to the resonator 104.

The resonator 104 includes an LC resonator having a resonant frequency same as the output frequency of the oscillator 103. The resonator 104 uses the primary coil 105 to transmit the power and the pulse train modulated with the audio signal at the same time using the resonant magnetic field.

The power receiver 200 receives the resonant magnetic field, which is input via the secondary coil 201, by means of the resonator 207 having a resonant frequency same as the resonant frequency of the resonator 104 and generates a received signal.

The rectifier 202 rectifies the received signal, which is an AC signal that may have a positive or negative value to convert the AC signal into a received signal which has only a positive value. The pulse amplitude of the received signal obtained at this time is labeled "V1". The received signal rectified by the rectifier 202 is sent to the wireless communication section 206 and the detector 203.

The detector 203 detects the rectified received signal to demodulate the received signal into a received pulse train. The detector 203 sends the received pulse train to the LPF 204. The LPF 204 is a low pass filter, and removes a radio frequency band component from the input received pulse train. By the radio frequency band component being removed from the received pulse train, an audio signal is generated. The LPF 204 sends the audio signal to the speaker 205 to reproduce a sound.

The wireless communication section 206 generates a DC voltage from the received signal sent from the rectifier 202 to obtain power for driving the circuits. The wireless communication section 206 continuously performs carrier sense in order to detect whether or not there is a request signal sent from the wireless communication section 107 in the power transmitter 100.

Now, an operation of the wireless power transmission system 2 in the case where the power transmitter 100 transmits a request signal to the power receiver 200 via the wireless communication section 107 will be described.

Even while the request signal is being transmitted, the audio signal source 101 outputs an audio signal, and the audio signal is transmitted to the power receiver 200 by the above-described processing.

When a request signal needs to be transmitted, the control section 106 in the power transmitter 100 sends a signal instructing the transmission of a request signal (instruction signal) to the pulse width modulation section 102 and the wireless communication section 107.

Upon receiving the instruction signal from the control section 106, the wireless communication section 107 generates a request signal. Next, the wireless communication section 107 performs modulation processing on the request signal to convert the request signal into a wireless signal of a predetermined frequency, and then transmits the wireless signal from the antenna 107a included in the wireless communication section 107.

Upon receiving the instruction signal from the control section 106, the pulse width modulation section 102 switches the pulse width modulation processing from the first pulse width modulation processing into second pulse width modulation processing in which the amplitude of the triangular wave used for comparison is decreased.

Figure 4:
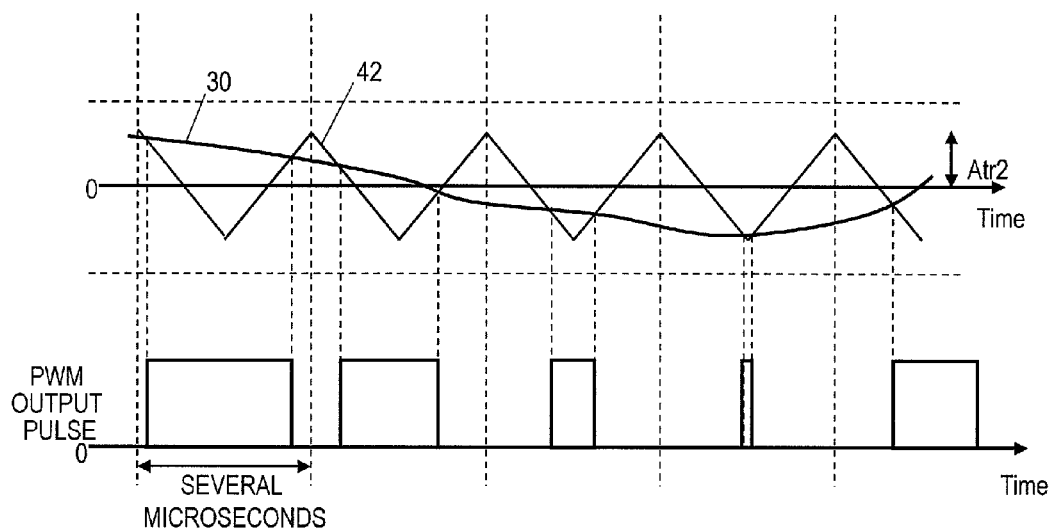
FIG. 4 shows an example of second pulse width modulation processing performed by the pulse width modulation section 102.

FIG. 4 shows an example of the second pulse width modulation processing. As shown in FIG. 4, the second pulse width modulation processing generates a pulse train by comparing the audio signal 30 input to the pulse width modulation section 102 against a second triangular wave 42 having a maximum amplitude Atr2. Namely, only in the time period in which the value of the audio signal 30 is larger than the value of the second triangular wave 42, a pulse is output. The relationship between the maximum amplitude Atr1 of the first triangular wave used in the first pulse width modulation processing and the maximum amplitude Atr2 of the second triangular wave used in the second pulse width modulation processing is represented by the following expression 1.

$$Atr1 > Atr2 \quad (1)$$

By such a setting of the amplitude of the triangular wave 42, the change amount (dynamic range) of the pulse width of the output pulse is larger in the second pulse width modulation processing than in the first pulse width modulation processing even when the value of the input audio signal is the same.

The pulse width modulation section 102 sends the pulse train obtained by the second pulse width modulation processing to the oscillator 103. The operation of the power transmitter 100 after this is substantially the same as the operation thereof in the case where the wireless communication is not performed, and so will not be described.

The power receiver 200 receives a resonant magnetic field, which is input via the secondary coil 201, by means of the resonator 207 having a resonant frequency same as that of the resonator 104 and generates a received signal.

The rectifier 202 rectifies the received signal, which is an AC signal that may have a positive or negative value, to convert the AC signal into a received signal which has only a positive value. The pulse amplitude of the received signal obtained at this time is labeled "V2". The received signal rectified by the rectifier 202 is sent to the wireless communication section 206 and the detector 203.

The wireless communication section 206 detects the request signal, transmitted by the wireless communication section 107, by carrier sense and then drives the receiving circuit to perform detection, demodulation and decoding processing on the request signal. Next, the wireless communication section 206 generates a response signal to the request signal. Then, the wireless communication section 206 drives the transmission circuit and performs modulation processing on the response signal to convert the response signal into a wireless signal of a predetermined frequency. After this, the wireless communication section 206 transmits the wireless signal from the antenna 206a. In this step, the wireless communication section 206 consumes a larger current than in the state of performing carrier sense, and so the impedance of the wireless communication section 206 is decreased. As a result, the impedance of the entire power receiver 200 as seen from the power transmitter 100 is also decreased. Therefore, the pulse amplitude V2 of the received signal obtained by the rectifier 202 is smaller than the pulse amplitude V1 of the received signal obtained while the wireless communication is not being performed. Accordingly, the amplitude of each modulated pulse of the received pulse train which is output from the detector 203 is smaller than that obtained while the wireless communication is not being performed.

The received pulse train having the amplitude decreased is input to the LPF 204 to generate an audio signal. At this point, the pulse width modulation section 102 in the power transmitter 100 is performing the second pulse width modulation processing, and so the change amount of the pulse width of each modulated pulse of the received pulse train is larger. Therefore, the amplitude of the audio signal which is output from the LPF 204 is, even when the amplitude of each modulated pulse is decreased, the same as the amplitude obtained while the wireless communication is not being performed. Hence, the volume of the sound reproduced from the speaker 205 is not changed.

Figure 5:
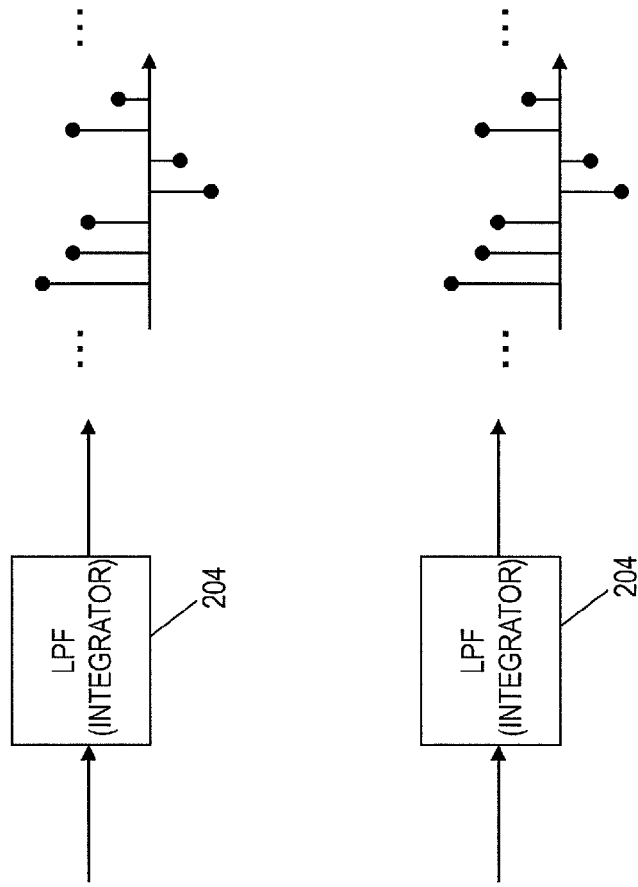
FIGS. 5A and 5B show examples of input signals to, and output signals from, an LPF 204 in the first and second pulse width modulation processing, respectively.

FIG. 5 shows that the level of the audio signal which is output from the LPF 204 is not changed between when the first pulse width modulation processing is performed and when the second pulse width modulation processing is performed. The LPF 204, which is a low pass filter, includes an integrator. Therefore, as shown in FIG. 5, (a) and (b), the output of the integrator is the same even when the amplitude of the input modulated pulse is decreased, as long as the pulse width is increased to counteract the decrease so that the area size of the modulated pulse is kept constant.

Upon receiving the response signal to the request signal, the wireless communication section 107 in the power transmitter 100 sends the contents of the response signal to the control section 106. The control section 106 sends a signal indicating the termination of the wireless communication to the pulse width modulation section 102 and the wireless communication section 107. Upon receiving the signal indicating the termination of the wireless communication, the pulse width modulation section 102 switches the pulse width modulation processing from the second pulse width modulation processing into the first pulse width modulation processing. The wireless communication section 107 stops the operation or is put into a sleep mode or any other state in which the power consumption is low.

The control section 106 is described above as outputting a signal instructing the start and termination of the period in which the second pulse width modulation processing is performed, but the present invention is not limited to such a form. For example, the control section 106 may transmit the instruction signal continuously while the second pulse width modulation processing needs to be performed. In this case, the pulse width modulation section 102 performs the second pulse width modulation processing only while receiving the instruction signal from the control section 106 and performs the first pulse width modulation processing while not receiving the instruction signal.

Now, with reference to FIG. 6, the relationship between the maximum amplitude Atr1 of the first triangular wave used in the first pulse width modulation processing and the maximum amplitude Atr2 of the second triangular wave used in the second pulse width modulation processing will be described.

While performing the wireless communication, the wireless communication section 206, for example, drives the transmission circuit and the receiving circuit and generates a carrier wave, and so requires higher power than while not performing the wireless communication. As a result, the impedance of the wireless communication section 206 is lower while the wireless communication is being performed than while the wireless communication is not being performed. A current ic2 flowing in the wireless communication section 206 while the wireless communication is being performed is larger than a current ic1 flowing in the wireless communication section 206 while the wireless communication is not being performed.

Here, where the audio signal has a value Aa, the pulse width of the modulated pulse while (a) the wireless communication is not being performed is labeled a first pulse width Wp1, and the pulse width of the modulated pulse while (b) the wireless communication is being performed is labeled a second pulse width Wp2. In order to make the area size Sp of the modulated pulse the same in the cases (a) and (b), the following expression 2 needs to be fulfilled.

$$Sp = V1 \times Wp1 = V2 \times Wp2 \tag{2}$$

In the expression, V1 and V2 are respectively pulse amplitudes of the pulses generated by the first pulse width modulation processing and the second pulse width modulation processing as described above. From expression 2, Wp2 is represented by the following expression 3.

$$Wp2 = (V1/V2)Wp1 \tag{3}$$

Figure 6:
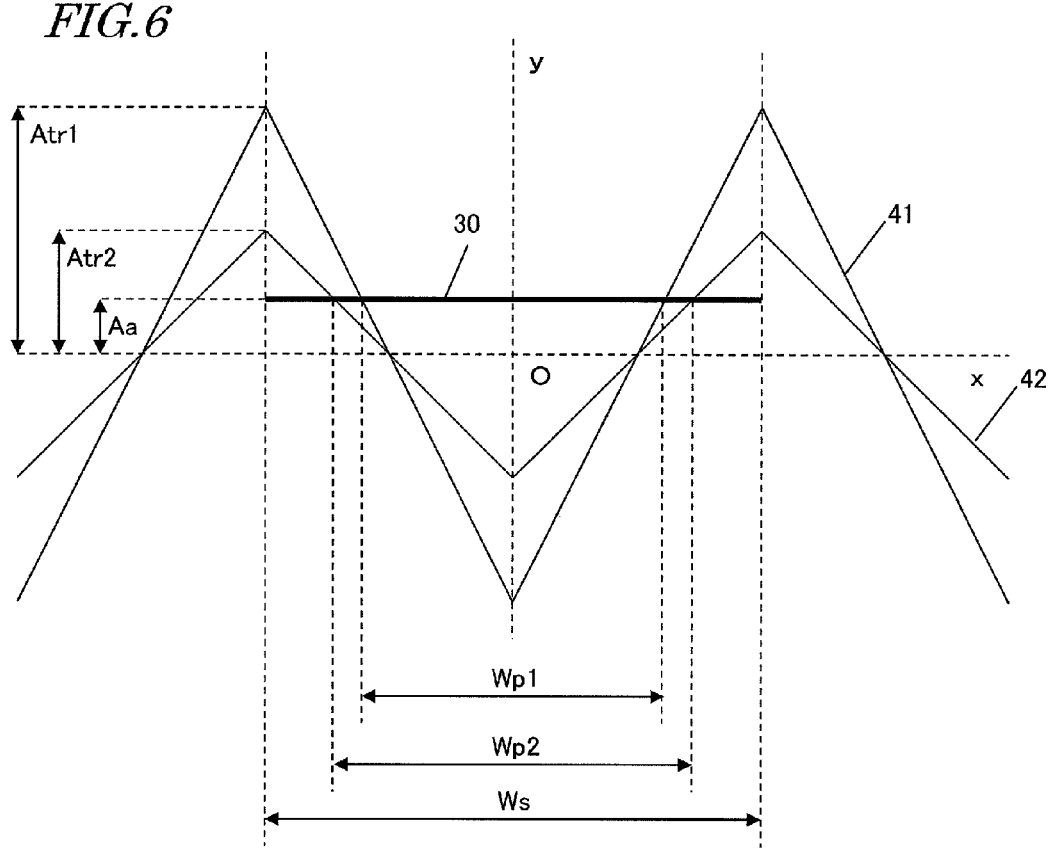
FIG. 6 shows the relationship between the amplitude of the triangular waves and the pulse width in the first and second pulse width modulation processing.

FIG. 6 shows the relationship among the audio signal 30, the first triangular wave 41 and the second triangular wave 42 in this example. The relationship between the maximum amplitude Atr1 of the first triangular wave and the maximum amplitude Atr2 of the second triangular wave, which realizes the pulse width in the case (a) to be the first pulse width Wp1 and realizes the pulse width in the case (b) to be the second pulse width Wp2 when the value of the audio signal is Aa, is found as follows. For the sake of simplicity, the following calculations are made with an assumption that the value Aa of the audio signal is kept constant in the sampling zone (between the apexes of the triangular waves).

First, the first pulse width Wp1 obtained when the audio signal having the value Aa is pulse-width-modulated by the first pulse width modulation processing is found. Where the sampling zone is Ws, the first pulse width Wp1 is found by the calculations provided below.

Here, the origin is labeled O, the horizontal axis is labeled x axis, and the vertical axis is labeled y axis. In the range from the origin O to Ws/2 in the x axial direction, the gradient of the first triangular wave 41 is 2Atr1/(Ws/2) and the intercept of the first triangular wave 41 on the y axis is -Atr1. Accordingly, in the range from the origin O to Ws/2 in the x axial direction, the first triangular wave is represented by the linear equation of the following expression 4.

$$y = 2Atr1/(Ws/2)x - Atr1 = (4Atr1/Ws)x - Atr1 \tag{4}$$

By substituting Wp1/2 for x and substituting Aa for y, the following expression 5 is obtained. By transforming expression 5, the first pulse width Wp1 of the pulse obtained by pulse width modulation performed by the first pulse width modulation processing is found as represented by expression 6.

$$Aa = (4Atr1/Ws) \times Wp1/2 - Atr1 \tag{5}$$

$$Wp1 = Ws(Aa + Atr1)/2Atr1 \tag{6}$$

Similarly, the second pulse width Wp2 of the pulse obtained by pulse width modulation performed by the second pulse width modulation processing is found as follows. First, by substituting Wp2/2 for x and substituting Aa for y, the following expression 7 is obtained. By transforming expression 7, Wp2 is found as represented by expression 8.

$$Aa = (4Atr2/Ws) \times Wp2/2 - Atr2 \tag{7}$$

$$Wp2 = Ws(Aa + Atr2)/2Atr2 \tag{8}$$

Next, by substituting expression 6 and expression 8 for expression 3, the following expression 9 is obtained.

$$Ws(Aa + Atr2)/2Atr2 = (V1/V2) \times Ws(Aa + Atr1)/2Atr1 \tag{9}$$

From expression 9, the relationship between the maximum amplitude Atr1 of the first triangular wave and the maximum amplitude Atr2 of the second triangular wave is derived as represented by expression 10.

$$Atr2 = Aa \times Atr1/\{(V-1) \times Atr1 + Aa \times V\} \tag{10}$$

In the expression, V represents V1/V2. From expression 10, the maximum amplitude Atr2 of the second triangular wave used in the second pulse width modulation processing can be found from the amplitude Aa of the audio signal at the time of the pulse width modulation, the maximum amplitude Atr1 of the first triangular wave used in the first pulse width modulation processing, and the ratio V of the pulse amplitude V1 of the received signal obtained while the wireless communication is not being performed and the pulse amplitude V2 of the received signal obtained while the wireless communication is being performed.

The ratio V of the pulse amplitude V1 of the received signal obtained while the wireless communication is not being performed and the pulse amplitude V2 of the received signal obtained while the wireless communication is being performed can be measured in advance at the stage of designing the wireless power transmission system 2. From the value of the ratio, the maximum amplitude Atr1 of the first triangular wave used in the first pulse width modulation processing and the maximum amplitude Atr2 of the second triangular wave used in the second pulse width modulation processing are found using expression 10. By setting Atr1 and Atr2 in this manner, the volume of the sound reproduced from the speaker 205 can be kept constant regardless of whether the wireless communication is being performed or not.

As described above, the wireless power transmission system 2 in this embodiment switches the pulse width modulation processing only in the time period in which the wireless communication section 107 in the power transmitter 100 and the wireless communication section 206 of the power receiver 200 perform the wireless communication, and thus increases or decreases the pulse width of the pulse train to be output by the pulse width modulation section 102. Owing to this, the distribution ratio of the received signal, distributed to the detector 203 and the wireless communication section 206 from the rectifier 202 in the power receiver 200, can be changed in accordance with whether the wireless communication is being performed or not. Thus, even when the pulse amplitude of the received signal to be distributed to the detector 203 is changed, the pulse width can be increased or decreased so as to counteract the change, so that the area size of each modulated pulse can be kept constant. As a result, the volume of the sound reproduced from the speaker 205 can be kept constant.

The wireless power transmission system 2 includes the control section 106 in the power transmitter 100. Owing to this, the timing when the pulse width modulation processing is switched to change the change amount of the pulse width of the pulse train which is output from the pulse width modulation section 102 can be synchronized with the timing when a request signal is transmitted from the wireless communication section 107. As a result, the control made to respond to the change in the power consumption state of the power receiver 200 located away from the power transmitter 100 can be provided merely by the power transmitter 100 with no feedback from the power receiver 200.

In this embodiment, the wireless communication section 107 in the power transmitter 100 and the wireless communication section 206 in the power receiver 200 perform the wireless communication using a carrier wave of a frequency different from the frequency for the power transmission, but the present invention is not limited to such a structure. For example, the wireless communication can be performed using a carrier wave used for the power transmission. In this case also, while the wireless communication is being performed, the power receiver 200 drives the circuits for receiving a request signal and transmitting a response signal to decrease the pulse amplitude of the received signal and thus to decrease the volume of the sound reproduced from the speaker 205. Accordingly, in this case also, the volume of the sound reproduced from the speaker 205 can be kept constant through application of the pulse width modulation processing in this embodiment.

In the wireless power transmission system 2 in this embodiment, the pulse width modulation section 102 switches the first pulse width modulation processing to the second pulse width modulation processing or vice versa based on a signal indicating whether the wireless communication is being performed or not, which is transmitted from the control section 106. The present invention is not limited to such a structure. The pulse width modulation processing is not limited to being switched between two stages, and may be switched among three or more stages of power width modulation. By switching the pulse width modulation processing among three or more stages, it is made possible to alleviate a change in the amount of increase or decrease of the pulse width. Such a structure can suppress a change in the volume of the sound reproduced from the speaker 205 when, for example, there is a transient response to a change in the current consumed by the wireless communication section 206. When the amplitude of a triangular wave is drastically changed, the ratio of a zone having a positive value (High) and a zone having a value of zero (Low) of the modulated pulse which is output by the pulse width modulation section 102 at the point of the drastic change may possibly not reflect the value of the audio signal accurately. Namely, there is a possibility that noise is generated. In the case where the amplitude of the triangular wave is changed among a plurality of stages, such generation of noise can be avoided.

Usually, the wireless communication section 206 consumes a different level of power when performing receiving processing from when performing transmission processing. Therefore, by the pulse width modulation processing being switched among three or more stages, the power transmitter 100 can transmit a pulse train of a different pulse width in accordance with, for example, the wireless communication section 206 is (1) performing carrier sense, (2) receiving a request signal, or (3) transmitting a response signal.

In this embodiment, the wireless power transmission system 2 uses a resonant magnetic coupling type power transmission method, but the present invention is not limited to this method. For example, a power transmission method of an electric field coupling type, an electromagnetic induction type, an electromagnetic wave type, a two-dimensional communication type or the like may be adopted. Even with these power transmission methods, the power supplied to the speaker 205 is changed as long as the power supplied to the wireless communication section 206 in the power receiver 200 is changed. Accordingly, the volume of the sound reproduced from the speaker 205 can be kept constant through application of the control in this embodiment.

In the above description, it is assumed that the audio signal source 101 outputs an analog signal. As described above, the audio signal source 101 may output digital signal. In addition, the pulse width can be determined with no comparison being performed using the triangular waves. Hereinafter, an example of structure for determining the pulse width in accordance with the level of the digital audio signal with no use of the triangular waves in the case where the audio signal source 101 outputs a digital audio signal will be described.

Figure 7:
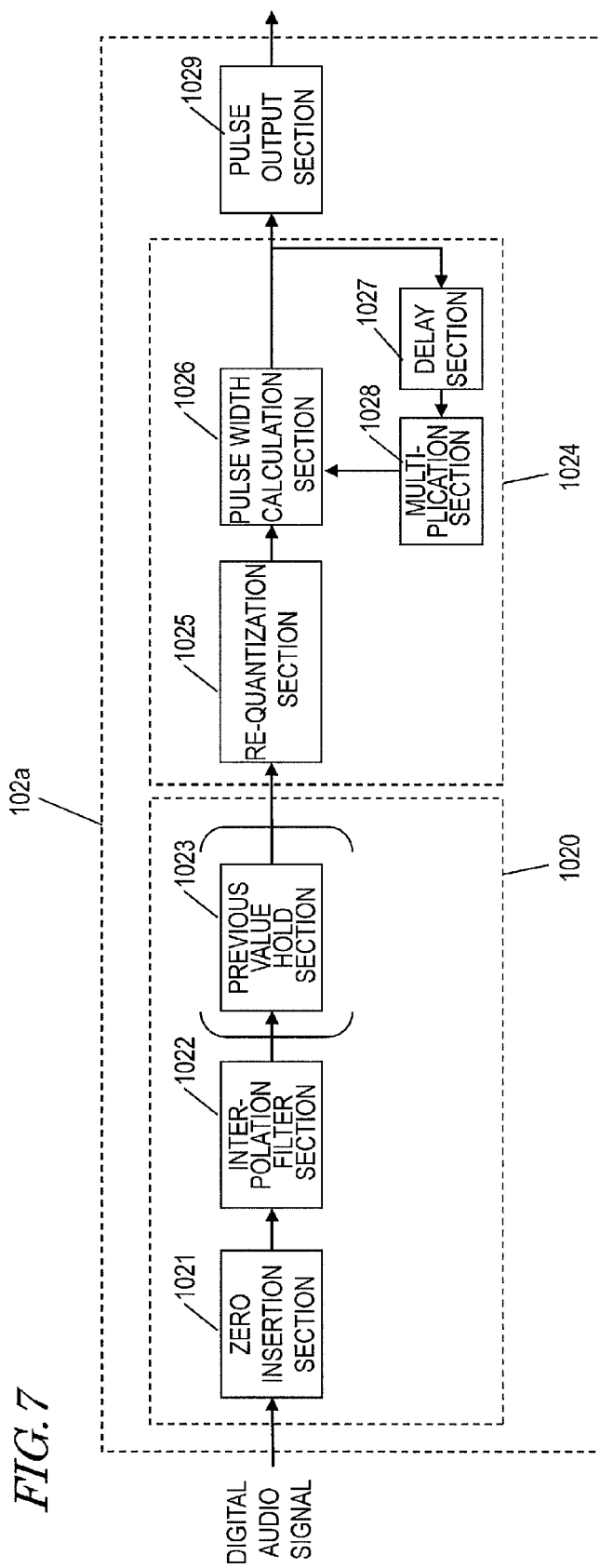
FIG. 7 shows an example of structure of a pulse width modulation section 102a for performing pulse width modulation on a digital audio signal.

FIG. 7 is a block diagram showing an example of internal structure of a pulse width modulation section 102a for performing pulse width modulation on a digital audio signal. As shown in FIG. 7, the pulse width modulation section 102a includes an oversampling section 1020, a ΔΣ modulation section 1024, and a pulse output section 1029. The oversampling section 1020 includes a zero insertion section 1021, an interpolation filter section 1022, and a holding previous value section 1023. The previous value hold section 1023 is not absolutely necessary. The ΔΣ modulation section 1024 includes a re-quantization section 1025, a pulse width calculation section 1026, a delay section 1027, and a multiplication section 1028.

A digital audio signal is a PCM signal having a sampling frequency fs of 48 kHz and a quantization bit rate bq of 16 bits. Here, it is assumed that 16-times oversampling and a first order delta-sigma modulation are performed, and then pulse width modulation is performed. The PCM signal is first input to the zero insertion section 1021 in the oversampling section 1020.

Figure 8A:
Figure 8B:
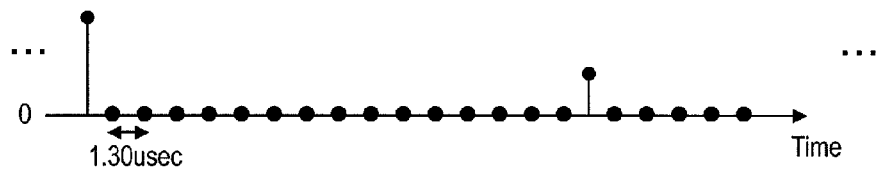
Figure 8C:
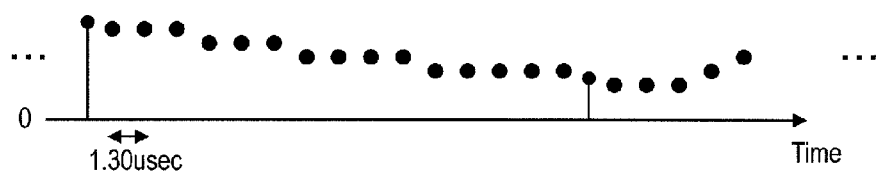

FIG. 8 illustrates the processing performed by the oversampling section 2010. FIG. 8, (a), shows an example of PCM signal which is input to the zero insertion section 1021. Here, since the sampling frequency fs is 48 kHz, the sampling cycle of the PCM signal is $1/fs \approx 20.8$ μsec.

As shown in FIG. 8, (b), when the PCM signal is input, the zero insertion section 1021 inserts PCM data of 15 zeros (zero insertion processing) before the next PCM signal is input. The zero insertion section 1021 sends the post-zero-insertion-processing PCM signal to the interpolation filter section 1022. The interpolation filter section 1022 performs interpolation filter processing (or low pass filter processing) on the zero-inserted PCM signal. As a result, as shown in FIG. 8, (c), non-zero values appear at the sampling points at which zeros were inserted, and the sampling points of the two 48 kHz PCM signals are interpolated by sampling points of 768 kHz (=48 kHz×16). In the case where the previous value hold section 1023 is provided, the interpolation filter section 1022 sends the post-interpolation PCM signal to the previous value hold section 1023. In the case where the previous value hold section 1023 is not provided, the interpolation filter section 1022 sends the post-interpolation PCM signal to the re-quantization section 1025 in the ΔΣ modulation section 1024.

The previous value hold section 1023 performs previous value hold processing on the post-interpolation PCM signal. By the previous value hold processing, the sampling frequency can be further raised. For example, the oversampling processing can be divided such that 8-times oversampling is performed by the zero insertion section 1021 and 4-times oversampling is performed by the previous value hold section 1023. This provides an advantage that the setting conditions for the interpolation filter section 1022 are alleviated.

The ΔΣ modulation section 1024 performs noise shaping by ΔΣ modulation on the oversampled PCM signal. Noise shaping is processing of coloring white noise (with no frequency dependence) caused by re-quantization which is generated when the amplitude level number Na ($=2^{bq}-1$) of the PCM signal is larger than the resolution Np of the pulse width, so that the re-quantization noise is concentrated to a region outside the audible frequency band. The resolution Np of the pulse width is a numerical value which depends on the processing capability of the processor (LSI, DSP, FPGA, etc.) which performs the pulse width modulation processing.

The re-quantization section 1025 in the ΔΣ modulation section 1024 re-quantizes the PCM signal which is input from the oversampling section 1020. Specifically, the PCM signal which is quantized with the amplitude level number Na is quantized into a PCM value of the pulse width resolution Np (Na>Np). The re-quantization section 1025 sends the re-quantized PCM signal to the pulse width calculation section 1026. The pulse width calculation section 1026 performs addition (subtraction) processing on the re-quantized PCM signal sent from the re-quantization section 1025 and a feedback component output from the multiplication section 1028, and thus determines the width of the pulse to be output. The pulse width calculation section 1026 sends the calculated pulse width to the delay section 1027 and the pulse output section 1029.

The delay section 1027 delays the pulse width which is output from the pulse width calculation section 1026 by one pulse, and sends the value of the delayed pulse to the multiplication section 1028. The multiplication section 1028 multiplies the pulse width delayed by the delay section 1027 by a predetermined coefficient, and outputs the resultant pulse width to the pulse width calculation section 1026.

It is in the case where a first order delta sigma modulation is used that the delay section 1027 delays the width of the pulse which is output from the pulse width calculation section 1026 by one pulse. When, for example, Nth-order delta sigma modulation is used, the delay section 1027 delays the pulse width by one pulse, two pulses, . . . N pulses, and inputs the value of each of the delayed pulses to the multiplication section 1028.

The pulse output section 1029 outputs the pulse having the pulse width sent from the pulse width calculation section 1026 to the oscillator 103. The pulses which are output from the pulse output section 1029 have a constant amplitude.

Now, pulse width correction processing performed when wireless communication is performed while the digital audio signal and the power are being transmitted will be described.

Pulse width correction of a digital audio signal is performed by digital computation processing. Here, the pulse width before the correction is labeled Wpd1, and the pulse width after the correction is labeled Wpd2. The pulse amplitude when the wireless communication section 206 in the power receiver 200 is operating is labeled Ad1, and the pulse amplitude when the wireless communication section 206 in the power receiver 200 is not operating is labeled Ad2. The pulse amplitude change degree Ma is defined as Ma=Ad1/Ad2 (≤1.0). The modulation degree of the pulse width modulation is labeled Mt (≤1.0). The modulation degree corresponds to the duty ratio of the pulse when the value of the PCM signal is maximum. For example, when Mt=1.0, the duty ratio is 100% when the PCM value is maximum. When Mt=0.5, the duty ratio is 50%. The amplitude level of a triangular wave when the duty ratio is 100% is labeled T.

Wpd2 may be set to the value represented by the following expression 11.

$$Wpd2 = \frac{1}{Ma}Wpd1 + \frac{1-Ma}{Ma}\cdot\left(\frac{1}{Mt}T\right) \quad (11)$$

Alternatively, Wpd2 may be set to the value represented by the following expression 12.

$$Wpd2 = \frac{Mt}{Ma}Wpd1 + \frac{1-Ma}{Ma}T \quad (12)$$

By controlling the pulse width modulation so as to fulfill expression 11 or 12, it is made possible to keep constant the power consumed by the power receiver 200, like in the case where analog audio data is transmitted.

Embodiment 2

Now, Embodiment 2 according to the present invention will be described.

The wireless power transmission system 2 in Embodiment 1 transmits power and an audio signal in superposition on the power, and reproduces sound from the speaker 205. By contrast, a wireless power transmission system in this embodiment transmits only power with no audio signal being transmitted, and supplies the power to a load device on the power receiver side. Hereinafter, a structure of the wireless power transmission system for transmitting only power will be described with reference to the drawings. The elements which have been described above are represented by identical reference numerals to those used above and descriptions thereof will be omitted.

Figure 9:
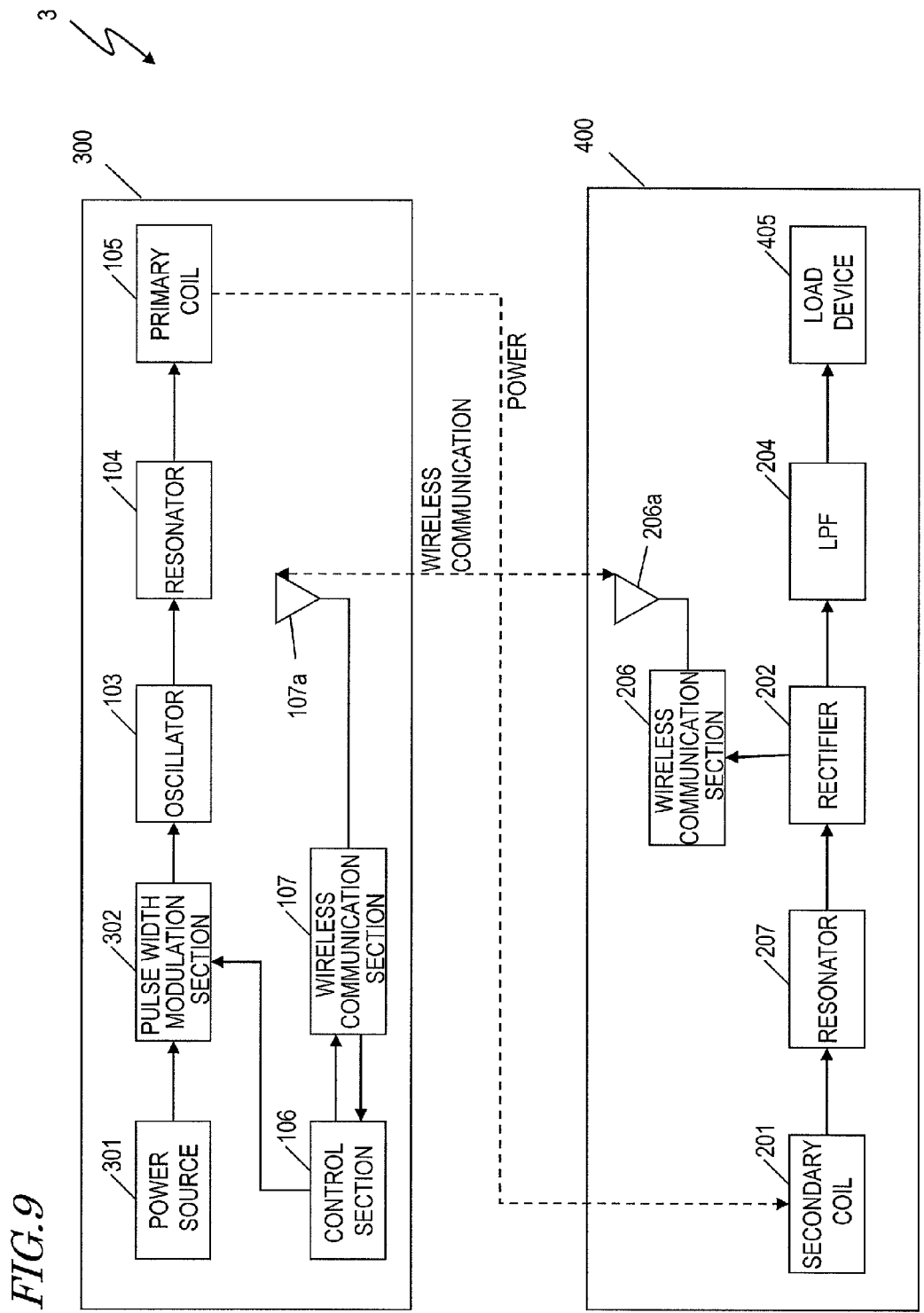
FIG. 9 is a structural view of a wireless power transmission system 3 in Embodiment 2.

FIG. 9 shows a structure of a wireless power transmission system 3 in this embodiment. The wireless power transmission system 3 includes a power transmitter 300 and a power receiver 400. The transmission 300 includes a power source 301, a pulse width modulation section 302, an oscillator 103, a resonator 104, a primary coil 105, a control section 106, and a wireless communication section 107. The power receiver 200 includes a secondary coil 201, a resonator 207, a rectifier 202, an LPF 204, a load device 405, and a wireless communication section 206. The difference of this embodiment from Embodiment 1 is in the power source 301, the pulse width modulation section 302 and the load device 406, and the other elements are identical as those in Embodiment 1.

The wireless power transmission system 3 in this embodiment transmits the pulse-width-modulated power by coupling of resonant magnetic fields occurring between the primary coil 105 and the secondary coil 201. The wireless power transmission system 3 also performs wireless communication via the wireless communication sections 107 and 206 in order to confirm that the power receiver 400 is present, perform authentication between the power transmitter and the power receiver, control the power transmission to be started and terminated, and notify a change in the power transmission efficiency caused by a change in the load or a change in the distance between the power transmitter and the power receiver.

Hereinafter, an operation of the wireless power transmission system 3 in this embodiment will be described.

First, an operation of the wireless power transmission system 3 while wireless communication is not being performed between the wireless communication section 107 in the power transmitter 300 and the wireless communication section 206 in the power receiver 400 will be described.

The power source 301 in the power transmitter 300 outputs, to the pulse width modulation section 302, a DC voltage obtained as a result of conversion from an AC power supply such as an AC electric outlet or the like, or a DC voltage obtained from a DC power supply such as an AC adaptor, a battery or the like. The pulse width modulation section 302 performs pulse width modulation on the DC voltage input from the power source 301.

Figure 10A:
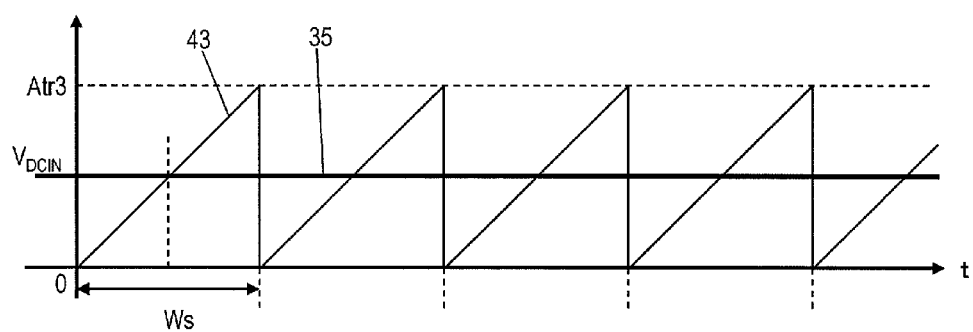
FIGS. 10A and 10B show an example of third pulse width modulation processing performed by a pulse width modulation section 302.
Figure 10B:
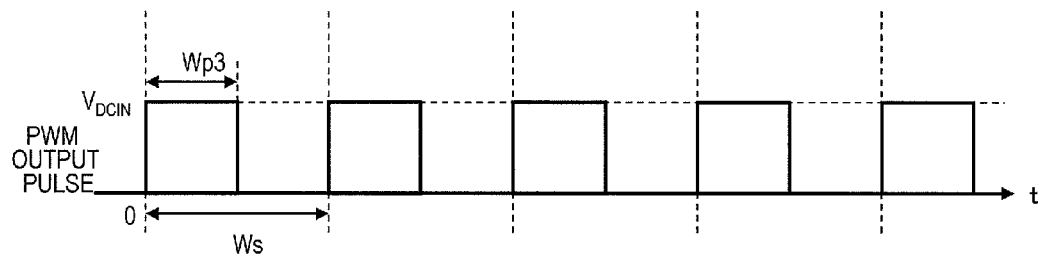

FIG. 10 shows an example of pulse width modulation performed on the DC voltage sent from the power source 301. As shown in FIG. 10, (a), the pulse width modulation section 302 performs switching processing on the DC voltage input from the power source 301 and having a voltage level VDCIN. As a result, as shown in FIG. 10, (b), a pulse having an amplitude VDCIN and a third pulse width Wp3 is output at an interval of sampling time Ws. Switching processing refers to processing of comparing the level of the DC voltage against the level of a third triangular wave which has an amplitude Atr3 and is repeated at an interval of sampling time Ws, and outputting a pulse only in the time period in which the level of the DC voltage is lower than the level of the third triangular wave. Unlike the first and second triangular waves in Embodiment 1, the third triangular wave in this embodiment is a sawtooth wave. In this specification, a sawtooth wave is encompassed in the "triangular wave" in addition to usual triangular waves. In the following description, this pulse width modulation processing will be referred to as the "third pulse width modulation processing". The pulse width modulation section 302 sends the resultant pulse train to the oscillator 103.

The oscillator 103 performs amplitude modulation on the pulse train at any output frequency in the range of several hertz to several gigahertz and thus amplifies the pulse train until the pulse train acquires power necessary for power transmission. The oscillator 103 sends the amplified pulse train to the resonator 104.

The resonator 104 includes an LC resonator having a resonant frequency same as the output frequency of the oscillator 103. The resonator 104 uses the primary coil 105 to transmit the power using the resonant magnetic field.

The power receiver 400 receives the resonant magnetic field, which is input via the secondary coil 201, by means of the resonator 207 having a resonant frequency same as the resonant frequency of the resonator 104 and generates a received signal.

The rectifier 202 rectifies the received signal, which is an AC signal that may have a positive or negative value to convert the AC signal into a received signal which has only a positive value. The pulse amplitude of the received signal obtained at this time is labeled "V3". The received signal rectified by the rectifier 202 is sent to the wireless communication section 206 and the LPF 204.

The LPF 204 is a low pass filter, and removes a radio frequency band component from the input received pulse train to obtain a DC voltage. The load device 405 is driven by the DC voltage obtained by the LPF 204. The wireless communication section 206 generates a DC voltage from the received signal sent from the rectifier 202 to obtain power for driving the circuits. While the wireless communication is not being performed, the wireless communication section 206 continuously performs carrier sense in order to detect whether or not there is a request signal sent from the wireless communication section 107 in the power transmitter 300.

The wireless power transmission system 3 is structured to transmit a DC voltage generated in the power transmitter 300 to the power receiver 400 by a pulse-width-modulated pulse train. Therefore, the power transmitter 300 can transmit the power, conformed to the rating of the load device 405 in the power receiver 400, to the power receiver 400 by changing the pulse width of the pulse train at the time of pulse width modulation.

Now, an operation of the wireless power transmission system 3 in the case where the power transmitter 300 transmits a request signal to the power receiver 400 via the wireless communication section 107 will be described.

When a request signal needs to be transmitted, the control section 106 in the power transmitter 300 sends a signal instructing the transmission of a request signal to the pulse width modulation section 302 and the wireless communication section 107.

Upon receiving the instruction signal from the control section 106, the wireless communication section 107 generates a request signal. Next, the wireless communication section 107 performs modulation processing on the request signal to convert the request signal into a wireless signal of a predetermined frequency, and then transmits the wireless signal from an antenna 107a included in the wireless communication section 107.

Upon receiving the instruction signal from the control section 106, the pulse width modulation section 302 changes the third triangular wave used for the pulse width modulation processing into a fourth triangular wave having an amplitude Atr4. The fourth triangular wave is also a sawtooth wave, not a usual triangular wave. Hereinafter, this pulse width modulation processing will be referred to as the "fourth pulse width modulation processing". As a result of this processing, the pulse width of the pulse to be output is changed to a forth pulse width Wp4.

Figure 11A:
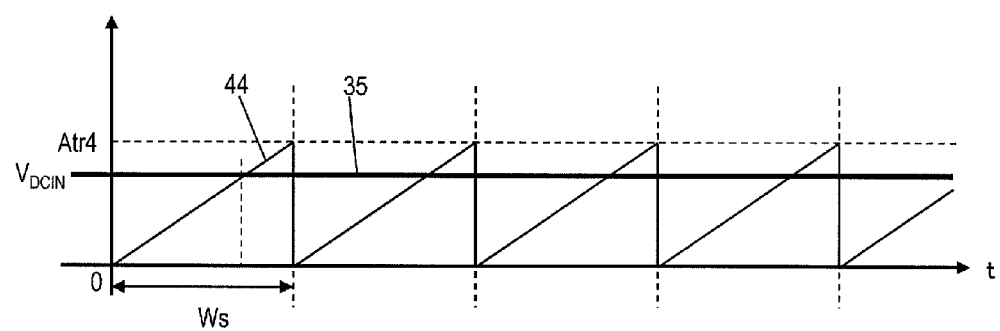
FIGS. 11A and 11B show an example of fourth pulse width modulation processing performed by the pulse width modulation section 302.
Figure 11B:
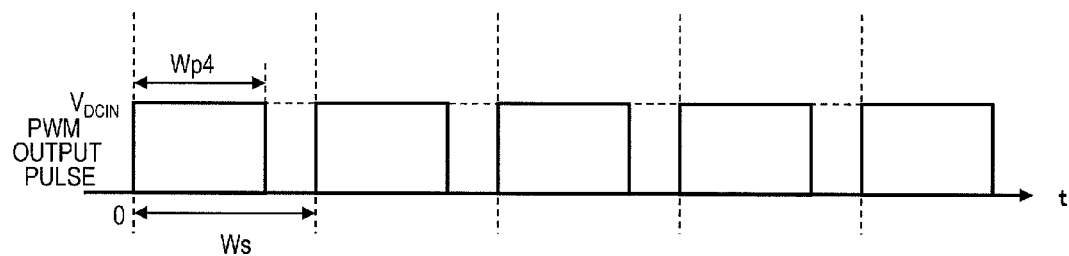

FIG. 11 shows an example of the fourth pulse width modulation processing. FIG. 11, (a), shows the DC voltage input from the power source 301 and having the voltage level VDCIN and the fourth triangular wave 44. FIG. 11, (b), shows an example of pulse train which is output from the pulse width modulation section 302. In the case where the fourth triangular wave 44 used in the fourth pulse width modulation processing is designed such that the amplitude Atr4 thereof is smaller than the amplitude Atr3 of the third sawtooth wave 43 used in the third pulse width modulation processing, the fourth pulse width Wp4 fulfills the relationship expressed by the following expression 13.

$$Wp4 > Wp3 \qquad (13)$$

By such a setting, the width of the output pulse (fourth pulse width Wp4) is larger than the third pulse width Wp3 even when the voltage level VDCIN of the DC voltage input from the power source 301 to the pulse width modulation section 302 is the same. Namely, the DC voltage obtained by passing the pulse train having the fourth pulse width Wp4 through the LPF 204 is higher than the DC voltage obtained by passing the pulse train having the third pulse width Wp3 through the LPF 204.

The pulse width modulation section 302 sends the pulse train having the fourth pulse width Wp4 to the oscillator 103.

The operation of the power transmitter 300 after this is substantially the same as the operation thereof in the case where the wireless communication is not performed, and so will not be described.

The power receiver 400 receives a resonant magnetic field, which is input via the secondary coil 201, by means of the resonator 207 having a resonant frequency same as that of the resonator 104 and generates a received signal.

The rectifier 202 rectifies the received signal, which is an AC signal that may have a positive or negative value, to convert the AC signal into a received signal which has only a positive value. The pulse amplitude of the received signal obtained at this time is labeled "V4". The received signal rectified by the rectifier 202 is sent to the wireless communication section 206 and the LPF 204.

The wireless communication section 206 detects the request signal, transmitted by the wireless communication section 107, by carrier sense and then drives the receiving circuit to perform detection, demodulation and decoding processing on the request signal. Next, the wireless communication section 206 generates a response signal to the request signal. Then, the wireless communication section 206 drives the transmission circuit and performs modulation processing on the response signal to convert the response signal into a wireless signal of a predetermined frequency. After this, the wireless communication section 206 transmits the wireless signal from an antenna 206a. In this step, the wireless communication section 206 consumes a larger current than in the state of performing carrier sense, and so the impedance of the wireless communication section 206 is decreased. As a result, the impedance of the entire power receiver 400 as seen from the power transmitter 300 is also decreased. Therefore, the pulse amplitude V4 of the received signal obtained by the rectifier 202 is smaller than the pulse amplitude V3 of the received signal obtained while the wireless communication is not being performed. Accordingly, the amplitude of each modulated pulse of the received pulse train which is input from the LPF 204 is smaller than the pulse amplitude obtained while the wireless communication is not being performed.

The received pulse train having the amplitude decreased is converted into a DC voltage by the LPF 204. At this point, the pulse width modulation section 302 in the power transmitter 300 is outputting a pulse having the fourth pulse width Wp4, and so the pulse width of each modulated pulse of the received pulse train is larger than that in the case where the wireless communication is not performed. Therefore, the DC voltage which is output from the LPF 204 is, even when the amplitude of each modulated pulse of the received pulse train which is input to the LPF 204 is decreased, the same as the amplitude obtained while the wireless communication is not being performed. Hence, the power supplied to the load device 405 is not changed. A reason for this is as follows. The LPF 204, which is a low pass filter, includes an integrator. Therefore, as shown in FIG. 5, the output of the integrator is the same even when the amplitude of the input modulated pulse is decreased, as long as the pulse width is increased to counteract the decrease so that the area size of the modulated pulse is kept constant.

Upon receiving the response signal to the request signal, the wireless communication section 107 in the power transmitter 300 sends the contents of the response signal to the control section 106. The control section 106 sends a signal indicating the termination of the wireless communication to the pulse width modulation section 302 and the wireless communication section 107. Upon receiving the signal indicating the termination of the wireless communication, the pulse width modulation section 302 switches the pulse width of the pulse to be output to the third pulse width Wp3. The wireless communication section 107 stops the operation or is put into a sleep mode or any other state in which the power consumption is low.

The control section 106 is described above as outputting a signal instructing the start and termination of the period in which the pulse of the fourth pulse width Wp4 is output, but the present invention is not limited to such a structure. For example, the control section 106 may transmit the instruction signal continuously while the pulse of the fourth pulse width Wp4 needs to be output. In this case, the pulse width modulation section 302 outputs a pulse train having the fourth pulse width Wp4 only while receiving the instruction signal from the control section 106 and outputs a pulse train having the third pulse width Wp3 while not receiving the instruction signal.

Now, with reference to FIG. 12, the relationship between the maximum amplitude Atr3 of the third triangular wave 43 used in the third pulse width modulation processing and the maximum amplitude Atr4 of the fourth triangular wave 44 used in the fourth pulse width modulation processing will be described.

While performing the wireless communication, the wireless communication section 206, for example, drives the transmission circuit and the receiving circuit and generates a carrier wave, and so requires higher power than while not performing the wireless communication. As a result, the impedance of the wireless communication section 206 is lower while the wireless communication is being performed than while the wireless communication is not being performed. A current ic2 flowing in the wireless communication section 206 while the wireless communication is being performed is larger than a current ic1 flowing in the wireless communication section 206 while the wireless communication is not being performed.

Here, where the value of the DC voltage is VDCIN, the pulse width of the modulated pulse while (a) the wireless communication is not being performed is labeled the third pulse width Wp3, and the pulse width of the modulated pulse while (b) the wireless communication is being performed is labeled the second pulse width Wp4. The voltage levels of the receiving pulses in the cases (a) and (b) are respectively labeled V3 and V4. In order to make the area size Sp of the modulated pulse the same in the cases (a) and (b), the following expression 14 needs to be fulfilled.

$$Sp = V3 \times Wp3 - V4 \times Wp4 \tag{14}$$

From expression 14, Wp4 is represented by the following expression 15.

$$Wp4 = (V3/V4)Wp3 \tag{15}$$

Figure 12:
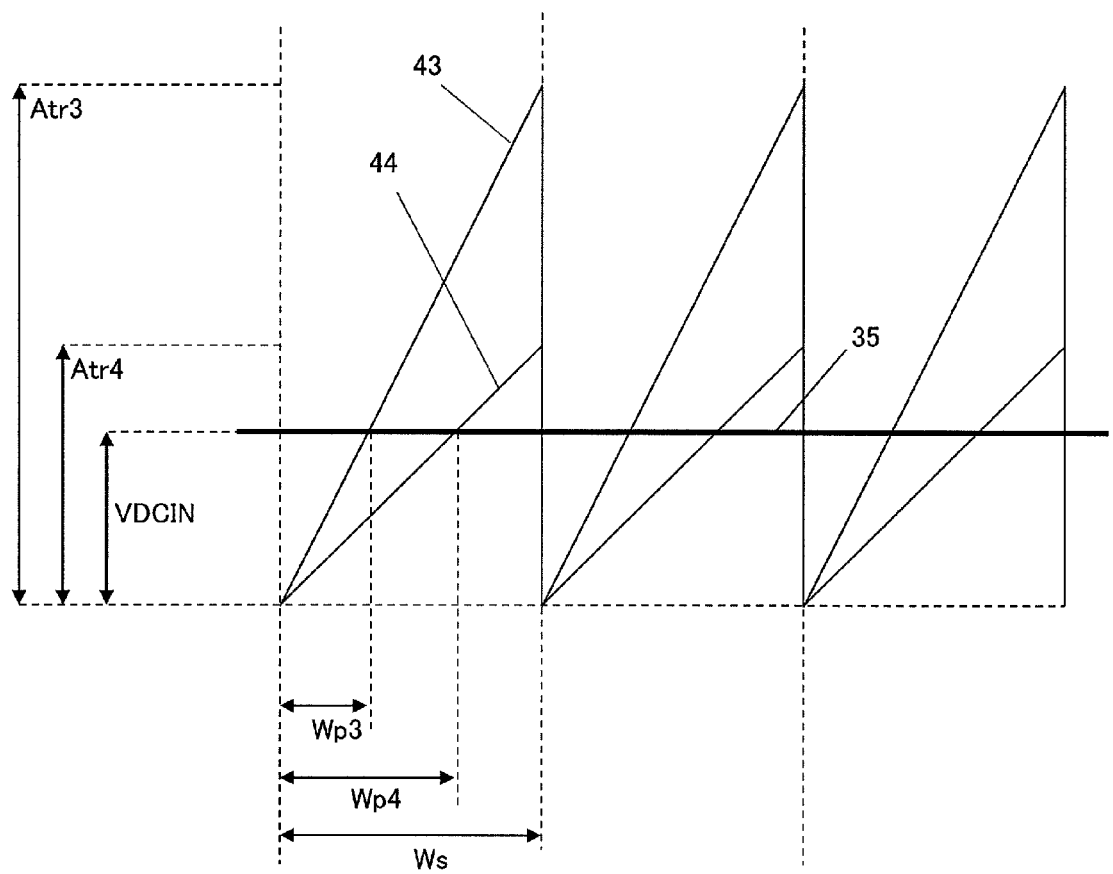
FIG. 12 shows the relationship between the amplitude of the sawtooth waves and the pulse width in the third and fourth pulse width modulation processing.

FIG. 12 shows the relationship among the DC voltage 35, the third triangular wave 43 and the fourth triangular wave 44 in this example. The relationship between the maximum amplitude Atr3 of the third triangular wave 43 and the maximum amplitude Atr4 of the fourth triangular wave 44, which realizes the pulse width in the case (a) to be the third pulse width Wp3 and realizes the pulse width in the case (b) to be the fourth pulse width Wp4 when the value of the DC voltage is VDCIN, is found as follows.

First, the third pulse width Wp3 obtained when the DC voltage having the value VDCIN is pulse-width-modulated by the third pulse width modulation processing is found. Where the sampling zone is Ws, the following expression 16 holds. Therefore, the third pulse width Wp3 is found by the following expression 17.

$$VDCIN = (Atr3/Ws) \times Wp3 \tag{16}$$

$$Wp3 = VDCIN \times Ws/Atr3 \quad (17)$$

The relationship between the DC voltage VDCIN and the pulse width Wp4 obtained when the pulse width modulation is performed by the fourth pulse width modulation processing is represented by the following expression 18. Therefore, the fourth pulse width Wp4 is found by the following expression 19.

$$VDCIN = (Atr4/Ws) \times Wp4 \quad (18)$$

$$Wp4 = VDCIN \times Ws/Atr4 \quad (19)$$

By substituting expression 17 and expression 18 for expression 15, the following expression 20 is obtained.

$$VDCIN \times Ws/Atr4 = (V3/V4) \times VDCIN \times Ws/Atr3 \quad (20)$$

From expression 20, the relationship between the maximum amplitude Atr3 of the third triangular wave and the maximum amplitude Atr4 of the fourth triangular wave is derived as represented by expression 21.

$$Atr4 = (V4/V3)Atr3 \quad (21)$$

From expression 21, it is understood that the ratio of the maximum amplitude Atr3 of the third triangular wave 43 used in the third pulse width modulation and the maximum amplitude Atr4 of the fourth triangular wave 44 used in the fourth pulse width modulation needs to be equal to the ratio of the pulse amplitude V3 of the received signal obtained while the wireless communication is not being performed and the pulse amplitude V4 of the received signal obtained while the wireless communication is being performed.

The ratio of the pulse amplitude V3 of the received signal obtained while the wireless communication is not being performed and the pulse amplitude V4 of the received signal obtained while the wireless communication is being performed can be measured in advance at the stage of designing the wireless power transmission system 3. From the value of the ratio, the maximum amplitude Atr4 of the fourth sawtooth wave used in the fourth pulse width modulation processing is found using expression 21. Thus, the voltage to be supplied to the load device 405 can be kept constant.

In this embodiment, as shown in FIG. 10 through FIG. 12, the sawtooth waves are used for the pulse width modulation processing. The present invention is not limited to such a structure. As the third triangular wave and the fourth triangular wave for pulse width modulation processing, usual triangular waves may be used. Even with the structure of using the usual triangular waves, the relationship between the amplitude of the triangular waves and the pulse width is substantially the same as that when the sawtooth waves are used. Therefore, the effect of this embodiment that the power supplied to the load device 405 is kept constant is obtained with no difference.

As described above, the wireless power transmission system 3 in this embodiment changes the width of the pulse to be output by the pulse width modulation section 302 between when the wireless communication is being performed and when the wireless communication is not being performed. By the width of the output pulse being changed from the third pulse width Wp3 to the fourth pulse width Wp4, the power supplied to the load device 405 can be kept constant even when higher power is consumed by the wireless communication section 206 in the power receiver 400 while the wireless communication is being performed.

Figure 13:
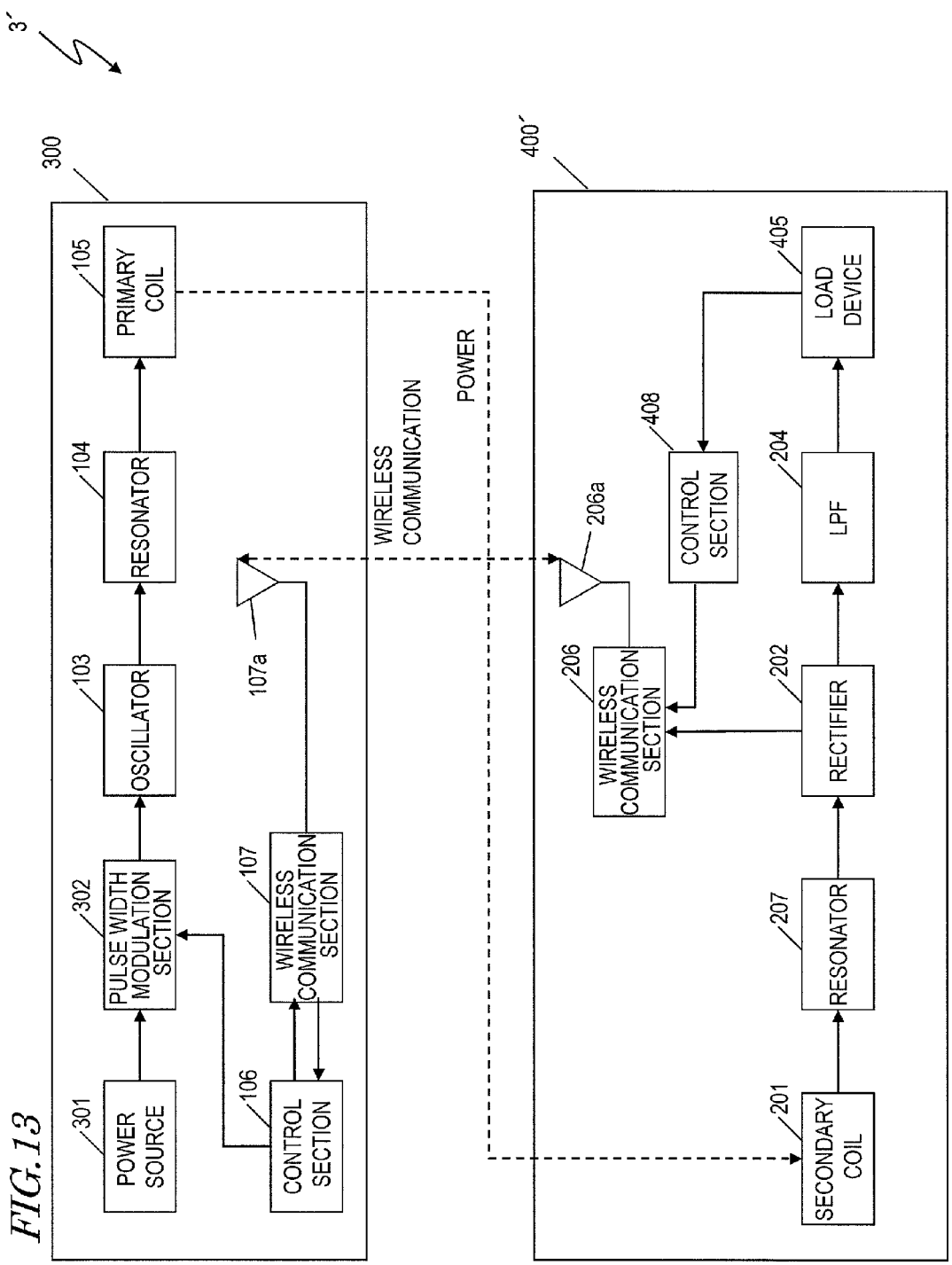
FIG. 13 is a structural view of a wireless power transmission system 3' in a modification of Embodiment 2.

In this embodiment, the power receiver 400 may include a control section for detecting a change in the power consumption of the load device 405 and controlling the wireless communication section 206 in accordance with the amount of decrease of the power. FIG. 13 shows a structure of a wireless power transmission system 3' including such a control section 408. The control section 408 is, for example, a microcomputer, and instructs the wireless communication section 206 to add information indicating the amount of decrease of the power to the signal, which is to be transmitted from the wireless communication section 206 to the power transmission-side wireless communication section 107. By provision of such a control section 408, the power transmitter 300 can know the amount of decrease of power caused due to power consumption by the load device 405 accurately and can improve the precision of the pulse width adjustment.

Embodiment 3

Now, Embodiment 3 according to the present invention will be described.

The wireless power transmission system 2 in Embodiment 1 changes the amplitude of the triangular wave used at the time of pulse width modulation performed on an audio signal, so that the volume of the sound reproduced from the speaker 205 is kept constant regardless of whether the wireless communication is being performed or not. By contrast, in this embodiment, the sampling cycle, not the amplitude of the triangular wave, is changed, so that the volume of the sound reproduced from the speaker 205 is kept constant regardless of whether the wireless communication is being performed or not. Hereinafter, a structure of a wireless power transmission system in this embodiment will be described with reference to the drawings. The elements which have been described above are represented by identical reference numerals to those used above and descriptions thereof will be omitted.

Figure 14:
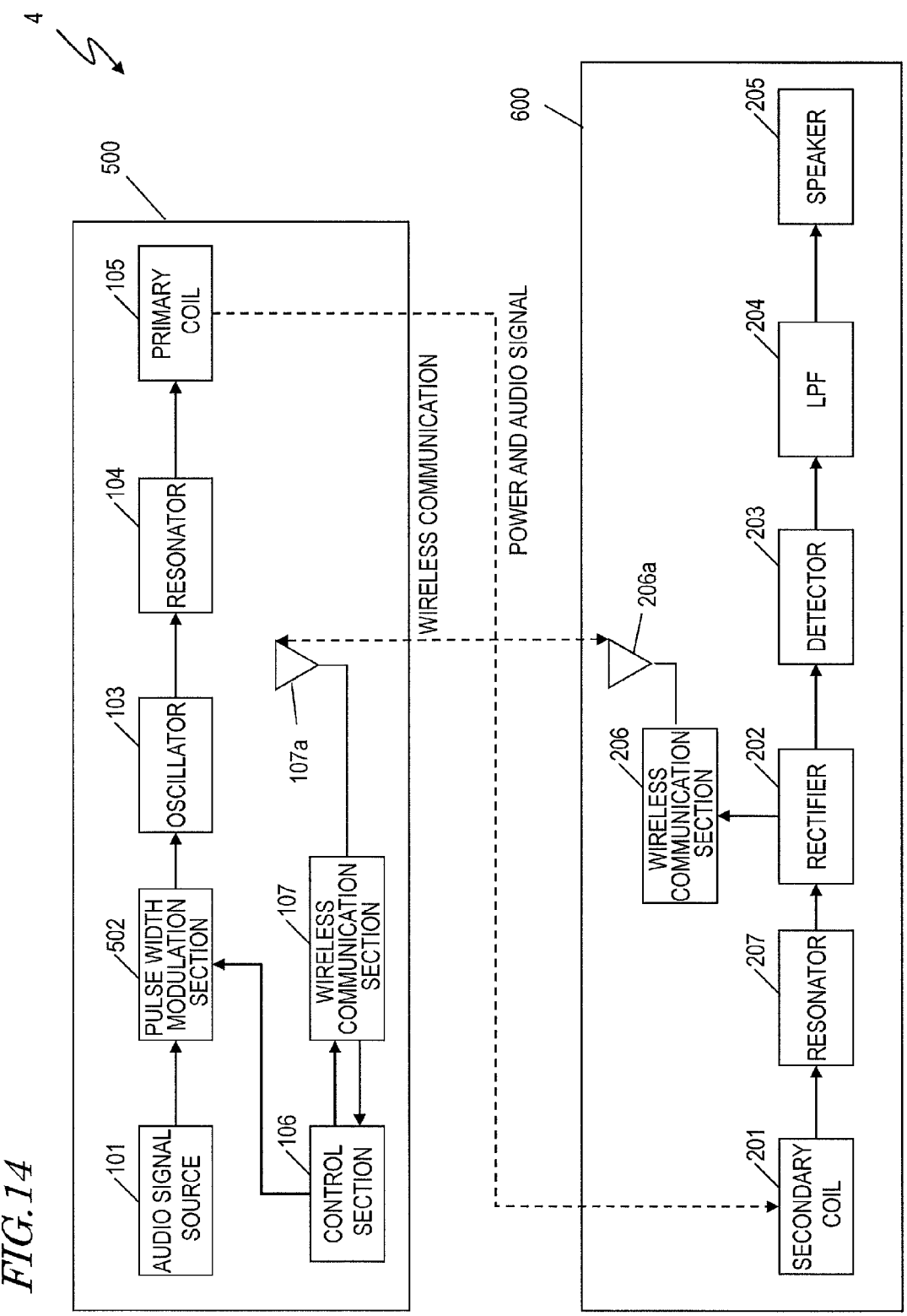
FIG. 14 is a structural view of a wireless power transmission system 4 in Embodiment 3.

FIG. 14 is a block diagram showing a wireless power transmission system 4 in this embodiment. The wireless power transmission system 4 includes a power transmitter 500 and a power receiver 600.

The power transmitter 500 includes an audio signal source 101, a pulse width modulation section 502, an oscillator 103, a resonator 104, a primary coil 105, a control section 106, and a wireless communication section 107. The power receiver 600 includes a secondary coil 201, a resonator 207, a rectifier 202, a detector 203, an LPF 204, a speaker 205, and a wireless communication section 206. Although not shown in FIG. 14, the power transmitter 500 is supplied with power from an AC power supply, from a DC power supply such as a battery or the like, or by wireless power transmission from another wireless power transmission system not shown.

First, an operation of the wireless power transmission system 4 while wireless communication is not being performed between the power transmitter 500 and the power receiver 600 will be described.

In the power transmitter 500, the audio signal source 101 outputs an audio signal, to be reproduced by the speaker 205 in the power receiver 600, to the pulse width modulation section 502. The pulse width modulation section 502 performs pulse width modulation on the audio signal input from the audio signal source 101.

The pulse width modulation section 502 compares the input audio signal against a triangular wave having a maximum amplitude Atr and a cycle Ws5. Only in the time period in which the amplitude of the audio signal is larger the amplitude of the triangular wave as a result of the comparison, a pulse is output. The comparison is performed such that a pulse having a duty ratio of 50% in the case where no audio signal is input or where the amplitude of the audio signal is 0 is output. In the following description, the above-described pulse width modulation processing will be referred to as the "fifth pulse width modulation processing", and the triangular wave used in the fifth pulse width modulation processing will be referred to as the "fifth triangular wave".

The pulse width modulation section 502 sends a pulse train obtained by performing the fifth pulse width modulation processing on the audio signal to the oscillator 103. The processing performed after this is the same as the processing performed by the power transmitter 100 and the power receiver 200 in Embodiment 1, and so will not be described.

Now, an operation of the wireless power transmission system 4 in the case where the power transmitter 500 transmits a request signal to the power receiver 600 via the wireless communication section 107 will be described.

Even while the request signal is being transmitted, the audio signal source 101 outputs an audio signal, and the audio signal is transmitted to the power receiver 600 by the above-described processing.

When a request signal needs to be transmitted, the control section 106 in the power transmitter 600 sends a signal instructing the transmission of a request signal to the pulse width modulation section 502 and the wireless communication section 107.

Upon receiving the instruction signal from the control section 106, the wireless communication section 107 generates a request signal. Next, the wireless communication section 107 performs modulation processing on the request signal to convert the request signal into a wireless signal of a predetermined frequency, and then transmits the wireless signal from an antenna 107a included in the wireless communication section 107.

Upon receiving the instruction signal from the control section 106, the pulse width modulation section 502 switches the pulse width modulation processing from the fifth pulse width modulation processing into sixth pulse width modulation processing.

The sixth pulse width modulation processing generates a pulse train by comparing the audio signal input to the pulse width modulation section 502 against a sixth triangular wave having a maximum amplitude Atr and a cycle Ws6. Namely, only in the time period in which the amplitude of the audio signal is larger than the amplitude of the sixth triangular wave, a pulse is output. The relationship between the cycle Ws5 of the fifth triangular wave used in the fifth pulse width modulation processing and the cycle Ws6 of the sixth triangular wave used in the sixth pulse width modulation processing is represented by the following expression 22.

$$Ws6 > Ws5 \tag{22}$$

By such a setting, the width of the output pulse is larger in the sixth pulse width modulation processing than in the fifth pulse width modulation processing even when the amplitude of the input audio signal is the same.

The pulse width modulation section 502 sends the pulse train obtained by the sixth pulse width modulation processing to the oscillator 103. The operation of the power transmitter 500 after this is substantially the same as the operation thereof in the case where the wireless communication is not performed, and so will not be described.

The power receiver 600 receives a resonant magnetic field, which is input via the secondary coil 201, by means of the resonator 207 having a resonant frequency same as that of the resonator 104 and generates a received signal.

The rectifier 202 rectifies the received signal, which is an AC signal that may have a positive or negative value, to convert the AC signal into a received signal which has only a positive value. The pulse amplitude of the received signal obtained at this time is labeled "V5". The received signal rectified by the rectifier 202 is sent to the wireless communication section 206 and the detector 203.

The wireless communication section 206 detects the request signal, transmitted by the wireless communication section 107, by carrier sense and then drives the receiving circuit to perform detection, demodulation and decoding processing on the request signal. Next, the wireless communication section 206 generates a response signal to the request signal. Then, the wireless communication section 206 drives the transmission circuit and performs modulation processing on the response signal to convert the response signal into a wireless signal of a predetermined frequency. After this, the wireless communication section 206 transmits the wireless signal from an antenna 206a. In this step, the wireless communication section 206 consumes a larger current than in the state of performing carrier sense, and so the impedance of the wireless communication section 206 is decreased. As a result, the impedance of the entire power receiver 600 as seen from the power transmitter 500 is also decreased. Therefore, the pulse amplitude V6 of the received signal obtained by the rectifier 202 is smaller than the pulse amplitude V5 of the received signal obtained while the wireless communication is not being performed. Accordingly, the amplitude of each modulated pulse of the received pulse train which is output from the detector 203 is smaller than that obtained while the wireless communication is not being performed.

The received pulse train having the amplitude decreased is input to the LPF 204 to generate an audio signal. At this point, the pulse width modulation section 502 in the power transmitter 500 is performing the sixth pulse width modulation processing, and so the pulse width of each modulated pulse of the received pulse train is larger. Therefore, the amplitude of the audio signal which is output from the LPF 204 is, even when the amplitude of each modulated pulse is decreased, the same as the amplitude obtained while the wireless communication is not being performed. Hence, the volume of the sound reproduced from the speaker 205 is not changed. A reason for this is as follows. The LPF 204, which is a low pass filter, includes an integrator. Therefore, the output of the integrator is the same as long as the area size of the modulated pulse is kept constant.

Upon receiving the response signal to the request signal, the wireless communication section 107 in the power transmitter 500 sends the contents of the response signal to the control section 106. The control section 106 sends a signal indicating the termination of the wireless communication to the pulse width modulation section 502 and the wireless communication section 107. Upon receiving the signal indicating the termination of the wireless communication, the pulse width modulation section 502 switches the pulse width modulation processing from the sixth pulse width modulation processing into the fifth pulse width modulation processing. The wireless communication section 107 stops the operation or is put into a sleep mode or any other state in which the power consumption is low.

Figure 15:
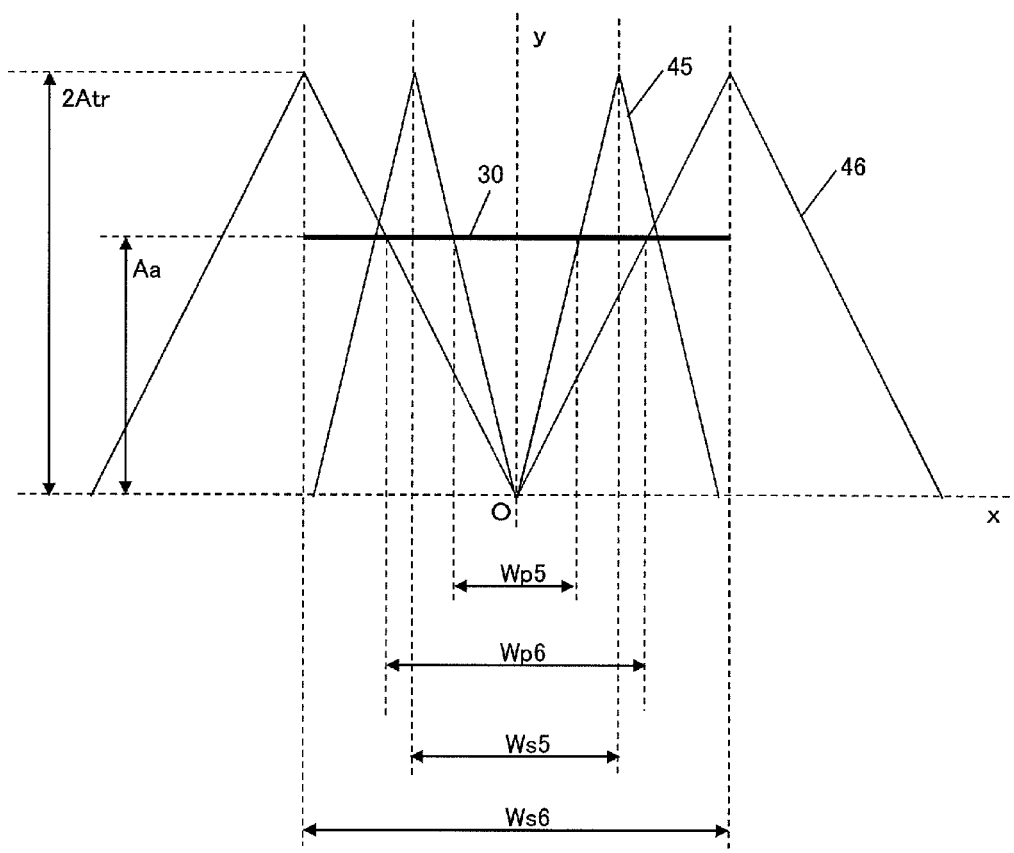
FIG. 15 shows the relationship between the amplitude of the triangular waves and the pulse width in fifth and sixth pulse width modulation processing.

Now, with reference to FIG. 15, the relationship between the cycle Ws5 of the fifth triangular wave 45 used in the fifth pulse width modulation processing and the cycle Ws6 of the sixth triangular wave 46 used in the sixth pulse width modulation processing will be described.

Here, where the audio signal has the value Aa, the pulse width of the modulated pulse while (a) the wireless communication is not being performed is labeled the fifth pulse width Wp5, and the pulse width of the modulated pulse while (b) the wireless communication is being performed is labeled the second pulse width Wp6. In order to make the area size Sp of the modulated pulse the same in the cases (a) and (b), the following expression 23 needs to be fulfilled.

$$Sp = V5 \times Wp5 = V6 \times Wp6 \quad (23)$$

From expression 23, Wp6 is represented by the following expression 24.

$$Wp6 = (V5/V6)Wp5 \quad (24)$$

First, the fifth pulse width Wp5 obtained when the audio signal having the value Aa is pulse-width-modulated by the fifth pulse width modulation processing is found. Where the sampling zone is Ws5, the following expression 25 holds. Therefore, the fifth pulse width Wp5 is found by the following expression 26.

$$Aa = (4Atr/Ws5) \times Wp5/2 \quad (25)$$

$$Wp5 = Ws5 \times Aa/2Atr \quad (26)$$

Since the following expression 27 holds, the sixth pulse width Wp6 of the pulse which is pulse-width-modulated by the sixth pulse width modulation processing is represented by the following expression 28.

$$Aa = (4Atr/Ws6) \times Wp6/2 \quad (27)$$

$$Wp6 = Ws6 \times Aa/2Atr \quad (28)$$

Next, by substituting expression 26 and expression 28 for expression 23, the following expression 29 is obtained.

$$Ws6 \times Aa/2Atr = (V5/V6) \times Ws5 \times Aa/2Atr \quad (29)$$

From expression 29, the relationship between the cycle Ws5 of the fifth triangular wave and the cycle Ws6 of the sixth triangular wave is derived as represented by expression 30.

$$Ws6 = (V5/V6)Ws5 \quad (30)$$

From expression 30, the cycle Ws6 of the sixth triangular wave 46 used in the sixth pulse width modulation processing can be found from the cycle Ws5 of the fifth triangular wave 45 used in the fifth pulse width modulation processing and the ratio of the pulse amplitude V5 of the received signal while the wireless communication is not being performed and the pulse amplitude V6 of the received signal while the wireless communication is being performed.

The ratio of the pulse amplitude V5 of the received signal while the wireless communication is not being performed and the pulse amplitude V6 of the received signal while the wireless communication is being performed can be measured in advance at the stage of designing the wireless power transmission system 4. From the value of the ratio, the cycle Ws6 of the sixth triangular wave 46 used in the sixth pulse width modulation processing is found using expression 30. Thus, the volume of the sound reproduced from the speaker 205 can be kept constant regardless of whether the wireless communication is being performed or not.

As described above, the wireless power transmission system 4 in this embodiment makes the cycle of the triangular wave used for the pulse width modulation processing relatively long only in the time period in which the wireless communication section 107 in the power transmitter 500 and the wireless communication section 206 of the power receiver 600 perform the wireless communication, and thus increases or decreases the pulse width of the pulse train to be output by the pulse width modulation section 502. Owing to this, the distribution ratio of the received signal, distributed to the detector 203 and the wireless communication section 206 by the rectifier 202 in the power receiver 600, is changed in accordance with whether the wireless communication is being performed or not. Thus, even when the pulse amplitude of the received signal to be distributed to the detector 203 is changed, the area size of each modulated pulse can be kept constant. As a result, the volume of the sound reproduced from the speaker 205 can be kept constant.

Embodiment 4

Now, Embodiment 4 according to the present invention will be described.

The wireless power transmission system 2 in Embodiment 1 changes the amplitude of the triangular wave at the time of pulse width modulation performed on an audio signal, so that the volume of the sound reproduced from the speaker 205 is kept constant regardless of whether the wireless communication is being performed or not. By contrast, in this embodiment, pulse width modulation is performed using a sawtooth wave and the amplitude of the sawtooth wave is changed, so that the volume of the sound reproduced from the speaker is kept constant regardless of whether the wireless communication is being performed or not. Hereinafter, a structure of a wireless power transmission system in this embodiment will be described with reference to the drawings. The elements which have been described above are represented by identical reference numerals to those used above and descriptions thereof will be omitted.

Figure 16:
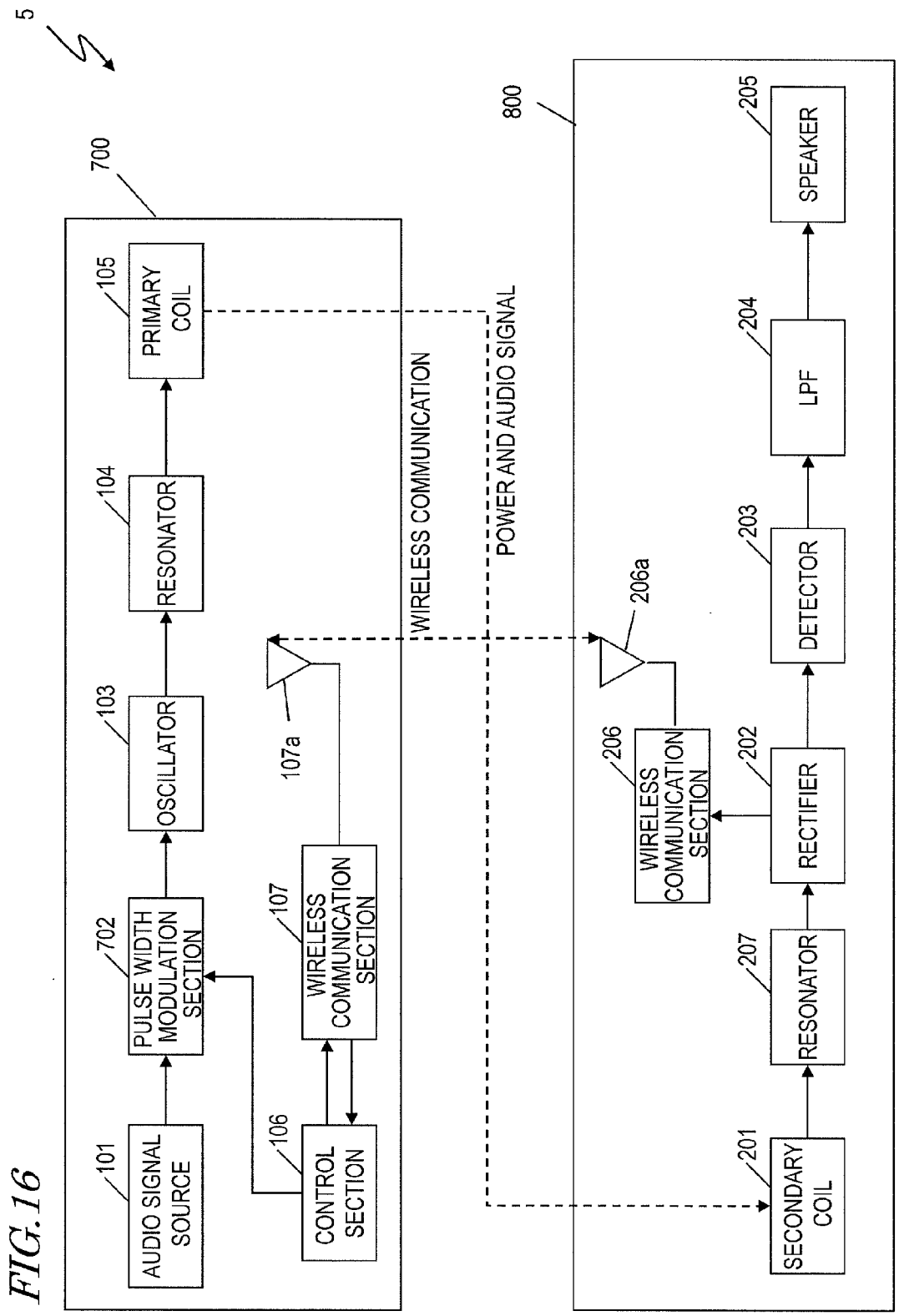
FIG. 16 is a structural view of a wireless power transmission system 5 in Embodiment 4.
Figure 17:
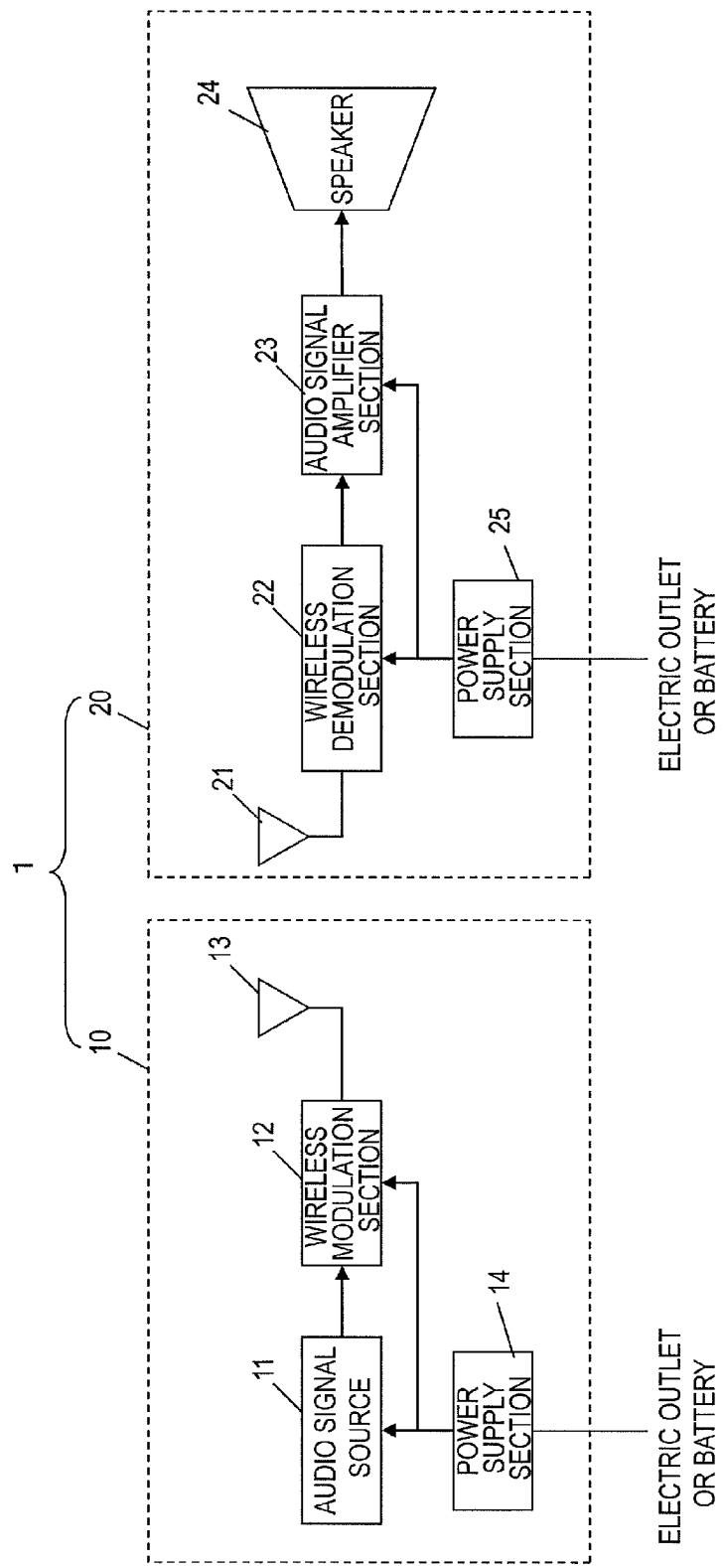
FIG. 17 shows a general structure of a conventional wireless speaker device.

FIG. 16 is a block diagram showing a wireless power transmission system in this embodiment. The wireless power transmission system 5 includes a power transmitter 700 and a power receiver 800.

The power transmitter 700 includes an audio signal source 101, a pulse width modulation section 702, an oscillator 103, a resonator 104, a primary coil 105, a control section 106, and a wireless communication section 107. The power receiver 800 includes a secondary coil 201, a resonator 207, a rectifier 202, a detector 203, an LPF 204, a speaker 205, and a wireless communication section 206. Although not shown in FIG. 16, the power transmitter 700 is supplied with power from an AC power supply, from a DC power supply such as a battery or the like, or by wireless power transmission from another wireless power transmission system not shown.

First, an operation of the wireless power transmission system 5 while wireless communication is not being performed between the power transmitter 700 and the power receiver 800 will be described.

In the power transmitter 700, the audio signal source 101 outputs an audio signal, to be reproduced by the speaker 205 in the power receiver 800, to the pulse width modulation section 702. The pulse width modulation section 702 performs pulse width modulation on the audio signal input from the audio signal source 101.

The pulse width modulation performed by the pulse width modulation section 702 compares the input audio signal against a sawtooth wave having a cycle of several microseconds (frequency: several hundred kilohertz to several megahertz) and a maximum amplitude Atr. Only in the time period in which the amplitude of the audio signal is larger than the amplitude of the sawtooth wave as a result of the comparison, a pulse is output. The comparison is performed such that a pulse having a duty ratio of 50% in the case where no audio signal is input or where the amplitude of the audio signal is 0 is output. In the following description, the above-mentioned pulse width modulation processing will be referred to as the "seventh pulse width modulation processing", and the sawtooth wave used in the seventh pulse width modulation processing will be referred to as the "seventh triangular wave".

The pulse width modulation section 702 sends a pulse train obtained by performing the seventh pulse width modulation processing on the audio signal to the oscillator 103. The processing performed after this is substantially the same as the processing performed by the power transmitter 100 and the power receiver 200 in Embodiment 1, and so will not be described.

Now, an operation of the wireless power transmission system 5 in the case where the power transmitter 700 transmits a request signal to the power receiver 800 via the wireless communication section 107 will be described.

Even while the request signal is being transmitted, the audio signal source 101 outputs an audio signal, and the audio signal is transmitted to the power receiver 800 by the above-described processing.

When a request signal needs to be transmitted, the control section 106 in the power transmitter 700 sends a signal instructing the transmission of a request signal to the pulse width modulation section 702 and the wireless communication section 107.

Upon receiving the instruction signal from the control section 106, the wireless communication section 107 generates a request signal. Next, the wireless communication section 107 performs modulation processing on the request signal to convert the request signal into a wireless signal of a predetermined frequency, and then transmits the wireless signal from an antenna 107a included in the wireless communication section 107.

Upon receiving the instruction signal from the control section 106, the pulse width modulation section 702 switches the pulse width modulation processing from the seventh pulse width modulation processing into eighth pulse width modulation processing.

The eighth pulse width modulation processing generates a pulse train by comparing the audio signal input to the pulse width modulation section 702 against a sawtooth wave having a maximum amplitude Atr8 (eighth sawtooth wave). Namely, only in the time period in which the amplitude of the audio signal is larger than the amplitude of the eighth sawtooth wave, a pulse is output. The relationship between a maximum amplitude Atr7 of the seventh triangular wave used in the seventh pulse width modulation processing and the maximum amplitude Atr8 of the eighth triangular wave used in the eighth pulse width modulation processing is represented by the following expression 31.

$$Atr7 > Atr8 \quad (31)$$

By such a setting, the width of the output pulse is larger in the eighth pulse width modulation processing than in the seventh pulse width modulation processing even when the amplitude of the input audio signal is the same.

The pulse width modulation section 702 sends the pulse train obtained by the eighth pulse width modulation processing to the oscillator 103. The operation of the power transmitter 700 after this is substantially the same as the operation thereof in the case where the wireless communication is not performed, and so will not be described.

The power receiver 800 receives a resonant magnetic field, which is input via the secondary coil 201, by means of the resonator 207 having a resonant frequency same as that of the resonator 104 and generates a received signal.

The rectifier 202 rectifies the received signal, which is an AC signal that may have a positive or negative value, to convert the AC signal into a received signal which has only a positive value. The pulse amplitude of the received signal obtained at this time is labeled "V8". The received signal rectified by the rectifier 202 is sent to the wireless communication section 206 and the detector 203.

The wireless communication section 206 detects the request signal, transmitted by the wireless communication section 107, by carrier sense and then drives the receiving circuit to perform detection, demodulation and decoding processing on the request signal. Next, the wireless communication section 206 generates a response signal to the request signal. Then, the wireless communication section 206 drives the transmission circuit and performs modulation processing on the response signal to convert the response signal into a wireless signal of a predetermined frequency. After this, the wireless communication section 206 transmits the wireless signal from an antenna 206a. In this step, the wireless communication section 206 consumes a larger current than in the state of performing carrier sense, and so the impedance of the wireless communication section 206 is decreased. As a result, the impedance of the entire power receiver 800 as seen from the power transmitter 700 is also decreased. Therefore, the pulse amplitude V8 of the received signal obtained by the rectifier 202 is smaller than a pulse amplitude V7 of the received signal obtained while the wireless communication is not being performed. Accordingly, the amplitude of each modulated pulse of the received pulse train which is output from the detector 203 is smaller than that obtained while the wireless communication is not being performed.

The received pulse train having the amplitude decreased is input to the LPF 204 to generate an audio signal. At this point, the pulse width modulation section 702 in the power transmitter 700 is performing the eighth pulse width modulation processing, and so the pulse width of each modulated pulse of the received pulse train is larger. Therefore, the amplitude of the audio signal which is output from the LPF 204 is, even when the amplitude of each modulated pulse is decreased, the same as the amplitude obtained while the wireless communication is not being performed. Hence, the volume of the sound reproduced from the speaker 205 is not changed. A reason for this is as follows. The LPF 204, which is a low pass filter, includes an integrator. Therefore, as shown in FIG. 5, the output of the integrator is the same even when the amplitude of the input modulated pulse is decreased, as long as the pulse width is increased to counteract the decrease so that the area size of the modulated pulse is kept constant.

Upon receiving the response signal to the request signal, the wireless communication section 107 in the power transmitter 700 sends the contents of the response signal to the control section 106. The control section 106 sends a signal indicating the termination of the wireless communication to the pulse width modulation section 702 and the wireless communication section 107. Upon receiving the signal indicating the termination of the wireless communication, the pulse width modulation section 702 switches the pulse width modulation processing from the eighth pulse width modulation processing into the seventh pulse width modulation processing. The wireless communication section 107 stops the operation or is put into a sleep mode or any other state in which the power consumption is low.

Now, the relationship between the maximum amplitude Atr7 of the seventh sawtooth wave used in the seventh pulse width modulation processing and the maximum amplitude Atr8 of the eighth sawtooth wave used in the eighth pulse width modulation processing will be described.

Here, where the audio signal has the value Aa, the pulse width of the modulated pulse while (a) the wireless communication is not being performed is labeled a seventh pulse width Wp7, and the pulse width of the modulated pulse while (b) the wireless communication is being performed is labeled an eighth pulse width Wp8. In order to make the area size Sp of the modulated pulse the same in the cases (a) and (b), the following expression 32 needs to be fulfilled.

$$Sp = V7 \times Wp7 = V8 \times Wp8 \qquad (32)$$

From expression 32, Wp8 is represented by the following expression 33.

$$Wp8 = (V7/V8)Wp7 \qquad (33)$$

Next, the relationship between the maximum amplitude Atr7 of the seventh triangular wave and the maximum amplitude Atr8 of the eighth triangular wave, which realizes the pulse width in the case (a) to be the seventh pulse width Wp7 and realizes the pulse width in the case (b) to be the eighth pulse width Wp8 when the value of the audio signal is Aa, is found as follows. By reading VDCIN, Atr3 and Atr4 in Embodiment 2 (FIG. 12) as Aa, Atr7 and Atr8 respectively, Atr7 and Atr8 can be found by exactly the same computations.

First, the seventh pulse width Wp7 obtained when the audio signal having the value Aa is pulse-width-modulated by the seventh pulse width modulation processing is found. Where the sampling zone is Ws, the following expression 34 holds. Therefore, the seventh pulse width Wp7 is found by the following expression 35.

$$Aa = (Atr7/Ws) \times Wp7 \qquad (34)$$

$$Wp7 = Aa \times Ws/Atr7 \qquad (35)$$

The relationship between the value Aa and the pulse width Wp8 of the audio signal which is pulse-width-modulated by the eighth pulse width modulation processing is represented by the following expression 36. Thus, the eighth pulse width Wp8 is found by the following expression 37.

$$Aa = (Atr8/Ws) \times Wp8 \qquad (36)$$

$$Wp8 = Aa \times Ws/Atr8 \qquad (37)$$

By substituting expression 35 and expression 37 for expression 33, the following expression 38 is obtained.

$$Aa \times Ws/Atr8 = (V7/V8) \times Aa \times Ws/Atr7 \qquad (38)$$

From expression 38, the relationship between the maximum amplitude Atr7 of the seventh triangular wave and the maximum amplitude Atr8 of the eighth triangular wave is derived as represented by expression 39.

$$Atr8 = (V8/V7)Atr7 \qquad (39)$$

From expression 39, it is understood that the ratio of the maximum amplitude Atr7 of the seventh triangular wave used in the seventh pulse width modulation processing and the maximum amplitude Atr8 of the eighth triangular wave used in the eighth pulse width modulation processing needs to be equal to the ratio of the pulse amplitude V7 of the received signal while the wireless communication is not being performed and the pulse amplitude V8 of the received signal while the wireless communication is being performed.

The ratio of the pulse amplitude V7 of the received signal while the wireless communication is not being performed and the pulse amplitude V8 of the received signal while the wireless communication is being performed can be measured in advance at the stage of designing the wireless power transmission system 5. From the value of the ratio, the maximum amplitude Atr8 of the eighth triangular wave used in the eighth pulse width modulation processing is found using expression 39. Thus, the volume of the sound reproduced from the speaker 205 can be kept constant regardless of whether the wireless communication is being performed or not.

As described above, the wireless power transmission system 5 in this embodiment switches the pulse width modulation processing only in the time period in which the wireless communication section 107 in the power transmitter 700 and the wireless communication section 206 of the power receiver 800 perform the wireless communication, and thus increases or decreases the pulse width of the pulse train to be output by the pulse width modulation section 702. Owing to this, the distribution ratio of the received signal, distributed to the detector 203 and the wireless communication section 206 by the rectifier 202 in the power receiver 800, is changed in accordance with whether the wireless communication is being performed or not. Thus, even when the pulse amplitude of the received signal to be distributed to the detector 203 is changed, the area size of each modulated pulse can be kept constant. As a result, the volume of the sound reproduced from the speaker 205 can be kept constant.

In Embodiments 1, 3 and 4, the power transmitters 100, 500 and 700 each include the audio signal source 101, and the power receivers 200, 600 and 800 each include the speaker 205. However, the signal transmitted from the power transmitter to the power receiver together with the power by the pulse width modulation is not limited to an audio signal. For example, the present invention may be applied to a system of transmitting data regarding the program which is currently viewed together with the power from a TV receiver to a remote control.

The power transmitter in each of the above-described embodiments changes the level of power to be transmitted by changing the pulse width in accordance with whether wireless communication is being performed or not, but the present invention is not limited to such a form. The power transmitter may change the level of power to be transmitted by changing the pulse amplitude in accordance with whether wireless communication is being performed or not. For example, in the case where the oscillator 103 has a class E amplifier circuit, the power to be transmitted can be controlled by the power supply voltage of the class E amplifier circuit being changed in accordance with whether wireless communication is being performed or not. Alternatively, a structure of controlling the power to be transmitted by changing both of the pulse width and the pulse amplitude can be adopted. Even in the case where such a structure is adopted, the amount of decrease of power, which corresponds to the power supplied to the load during the wireless communication, can be compensated for. Therefore, stable power transmission can be maintained.

With a wireless power transmission system according to the present invention, even when the state of a receiving-side device is changed, such a change does not influence the operation. Therefore, the present invention is useful for a wireless speaker device or the like which is capable of transmitting an audio signal together with power.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A power transmitter usable in a wireless power transmission system for transmitting power from the power transmitter to a power receiver wirelessly, the power transmitter comprising:
   a power transmitting section for transmitting power;
   a communication section for communicating information, for controlling the transmission of the power, with the power receiver; and
   a control section for controlling the power transmitting section such that the power to be sent out is higher while the communication section is performing the communication than while the communication section is not performing the communication, wherein:
   the power transmitting section transmits the power to be transmitted after converting the power into a pulse train; and
   the control section controls the power transmitting section such that at least one of a pulse width and a pulse amplitude of the pulse train is larger while the communication section is performing the communication than while the communication section is not performing the communication.

2. The power transmitter of claim 1, wherein the control section controls the power transmitting section such that the pulse amplitude of the pulse train is larger while the communication section is performing the communication than while the communication section is not performing the communication.

3. The power transmitter of claim 1, wherein the control section controls the power transmitting section such that the pulse width of the pulse train is wider while the communication section is performing the communication than while the communication section is not performing the communication.

4. The power transmitter of claim 3, wherein:
   the communication section starts communicating with the power receiver by transmitting a request signal to the power receiver; and
   when the communication section transmits the request signal, the control section transmits a signal instructing to increase the pulse width of the pulse train to the power transmitting section.

5. The power transmitter of claim 3, wherein the power transmitting section generates the pulse train by pulse width modulation.

6. The power transmitter of claim 5, wherein:
   the power transmitting section generates the pulse-width-modulated pulse train by comparing a waveform of the power to be transmitted against a triangular wave; and
   the control section controls the power transmitting section so as to change an amplitude or a cycle of the triangular wave in accordance with whether the communication section is performing the communication or not.

7. The power transmitter of claim 5, wherein the control section instructs the power transmitting section to make the amplitude of the triangular wave relatively small while the communication section is performing the communication and to make the amplitude of the triangular wave relatively large while the communication section is not performing the communication.

8. The power transmitter of claim 5, wherein the control section instructs the power transmitting section to make the cycle of the triangular wave relatively long while the communication section is performing the communication and to make the cycle of the triangular wave relatively short while the communication section is not performing the communication.

9. The power transmitter of claim 1, further comprising a signal source for outputting a signal;
   wherein the power transmitting section generates the pulse train by performing pulse width modulation on the signal output from the signal source.

10. The power transmitter of claim 9, wherein the signal is an audio signal.

11. The power transmitter of claim 1, wherein the power transmitting section includes:
    a pulse width modulation section for outputting the pulse train by pulse width modulation;
    an oscillation section for generating radio frequency power based on the pulse train output from the pulse width modulation section; and
    a power transmission resonator for transmitting the radio frequency power generated by the oscillation section;
    wherein the control section controls the power transmitting section by sending a control signal to the pulse width modulation section.

12. A wireless power transmission system comprising a power transmitter and a power receiver, wherein:
    the power transmitter includes:
       a power transmitting section for transmitting power;
       a power transmitting-side communication section for communicating information, for controlling the transmission of the power, with the power receiver; and
       a control section for controlling the power transmitting section such that the power to be sent out is higher while the power transmitting-side communication section is performing the communication than while the power transmitting-side communication section is not performing the communication; and
    the power receiver includes:
       a power receiving section for receiving the power sent out from the power transmitting section; and
       a power receiving-side communication section for communicating with the power transmitting-side communication section,
    wherein:
       the power transmitting section transmits the power to be transmitted after converting the power into a pulse train; and
       the control section controls the power transmitting section such that at least one of a pulse width and a pulse amplitude of the pulse train is larger while the communication section is performing the communication than while the communication section is not performing the communication.

13. The wireless power transmission system of claim 12, wherein:
    the power transmitter further comprises a signal source for outputting a signal;
    the power transmitting section generates the pulse train by performing pulse width modulation on the signal output from the signal source; and
    the power receiver reproduces the signal from the power received by the power receiving section.

* * * * *